United States Patent
Ono et al.

(10) Patent No.: US 11,946,112 B2
(45) Date of Patent: *Apr. 2, 2024

(54) HIGH-STRENGTH STEEL SHEET AND METHOD FOR PRODUCING SAME

(71) Applicant: JFE Steel Corporation, Tokyo (JP)

(72) Inventors: Yoshihiko Ono, Tokyo (JP); Yuma Honda, Tokyo (JP); Shimpei Yoshioka, Tokyo (JP); Koichi Taniguchi, Tokyo (JP); Hiroshi Matsuda, Tokyo (JP); Takeshi Murai, Tokyo (JP); Nobuyuki Nakamura, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 569 days.

This patent is subject to a terminal disclaimer.

(21) Appl. No.: 17/270,613

(22) PCT Filed: Aug. 22, 2019

(86) PCT No.: PCT/JP2019/032798
§ 371 (c)(1),
(2) Date: Feb. 23, 2021

(87) PCT Pub. No.: WO2020/045219
PCT Pub. Date: Mar. 5, 2020

(65) Prior Publication Data
US 2021/0332454 A1   Oct. 28, 2021

(30) Foreign Application Priority Data
Aug. 31, 2018   (JP) .................................. 2018-162572

(51) Int. Cl.
*C21D 9/46* (2006.01)
*C21D 6/00* (2006.01)
(Continued)

(52) U.S. Cl.
CPC ............... *C21D 9/46* (2013.01); *C21D 6/005* (2013.01); *C21D 6/008* (2013.01); *C21D 8/0205* (2013.01);
(Continued)

(58) Field of Classification Search
None
See application file for complete search history.

(56) References Cited

U.S. PATENT DOCUMENTS 9,650,690 B2   5/2017   Yamamoto et al.
10,941,471 B2 *   3/2021   Kawamura ............. C23C 2/024
(Continued)

FOREIGN PATENT DOCUMENTS

JP    54131522 A    10/1979
JP    60228655 A    11/1985
(Continued)

OTHER PUBLICATIONS

Chinese Office Action with Search Report for Chinese Application No. 201980055998.6, dated Aug. 25, 2021, 12 pages.
(Continued)

*Primary Examiner* — Scott R Kastler
(74) *Attorney, Agent, or Firm* — Buchanan Ingersoll & Rooney PC

(57) ABSTRACT

A high-strength steel sheet of the present invention has a specific chemical composition. Furthermore, in the steel sheet, a degree of Mn segregation in a specific region is 1.5 or less; a maximum P concentration in a specific region is 0.08 mass % or less; in a specific region, at least one specific MnS particle group is present, the number of specific MnS particle groups is 2.0 or fewer per 1 $mm^2$, and the number of specific oxide-based inclusions is 8 or fewer per 1 $mm^2$; of all oxide-based inclusions, oxide-based inclusions having a specific composition are present in a number ratio of 80%
(Continued)

or greater; the microstructure includes, in terms of a volume fraction, 30 to 95% martensite, 5 to 70% ferrite phase, less than 30% (and 0% or greater) bainite, and less than 2.0% (and 0% or greater) austenite phase; and a tensile strength is 980 MPa or greater.

12 Claims, 3 Drawing Sheets

(51) Int. Cl.
| | |
|---|---|
| C21D 8/02 | (2006.01) |
| C22C 38/00 | (2006.01) |
| C22C 38/02 | (2006.01) |
| C22C 38/04 | (2006.01) |
| C22C 38/06 | (2006.01) |
| C22C 38/08 | (2006.01) |
| C22C 38/12 | (2006.01) |
| C22C 38/14 | (2006.01) |
| C22C 38/16 | (2006.01) |
| C22C 38/42 | (2006.01) |
| C22C 38/44 | (2006.01) |
| C22C 38/46 | (2006.01) |
| C22C 38/48 | (2006.01) |
| C22C 38/50 | (2006.01) |
| C22C 38/54 | (2006.01) |
| C22C 38/58 | (2006.01) |
| C22C 38/60 | (2006.01) |
| C23C 2/02 | (2006.01) |
| C23C 2/06 | (2006.01) |
| C23C 2/40 | (2006.01) |

(52) U.S. Cl.
CPC ......... *C21D 8/0226* (2013.01); *C21D 8/0236* (2013.01); *C21D 8/0247* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *C22C 38/60* (2013.01); *C23C 2/02* (2013.01); *C23C 2/0224* (2022.08); *C23C 2/024* (2022.08); *C23C 2/06* (2013.01); *C23C 2/40* (2013.01); *C21D 2211/001* (2013.01); *C21D 2211/002* (2013.01); *C21D 2211/005* (2013.01); *C21D 2211/008* (2013.01)

(56) References Cited

U.S. PATENT DOCUMENTS

| | | | |
|---|---|---|---|
| 2018/0100212 A1 | 4/2018 | Ono et al. | |
| 2018/0363088 A1 | 12/2018 | Tsuzumi et al. | |
| 2019/0017156 A1 | 1/2019 | Kawamura et al. | |
| 2021/0332454 A1* | 10/2021 | Ono | C22C 38/58 |
| 2021/0340641 A1* | 11/2021 | Ono | C23C 2/40 |

FOREIGN PATENT DOCUMENTS

| | | |
|---|---|---|
| JP | 0787998 B2 | 9/1995 |
| JP | 09111398 A | 4/1997 |
| JP | 2001081533 A | 3/2001 |
| JP | 2009215571 A | 9/2009 |
| JP | 2009221522 A | 10/2009 |
| JP | 2009299137 A | 12/2009 |
| JP | 2010013700 A | 1/2010 |
| JP | 2011111670 A | 6/2011 |
| JP | 2014008513 A | 1/2014 |
| JP | 2017193758 A | 10/2017 |
| WO | 2016152163 A1 | 9/2016 |
| WO | 2017026125 A1 | 2/2017 |
| WO | 2017115748 A1 | 7/2017 |

OTHER PUBLICATIONS

Kurayasu, H. et al., "Phase Analysis of Ca-containing Inclusions in Ca-treated Steels," 1996, vol. 82(12), pp. 1-10, Iron and Steel.

Extended European Search Report for European Application No. 19 855 992.4, dated Jul. 30, 2021, 9 pages.

Chinese Office Action for Chinese Application No. 201980055998. 6, dated Mar. 4, 2022 with Concise Statement of Relevance of Office Action, 9 pages.

International Search Report and Written Opinion for International Application No. PCT/JP2019/032798, dated Nov. 5, 2019, 7 pages.

* cited by examiner

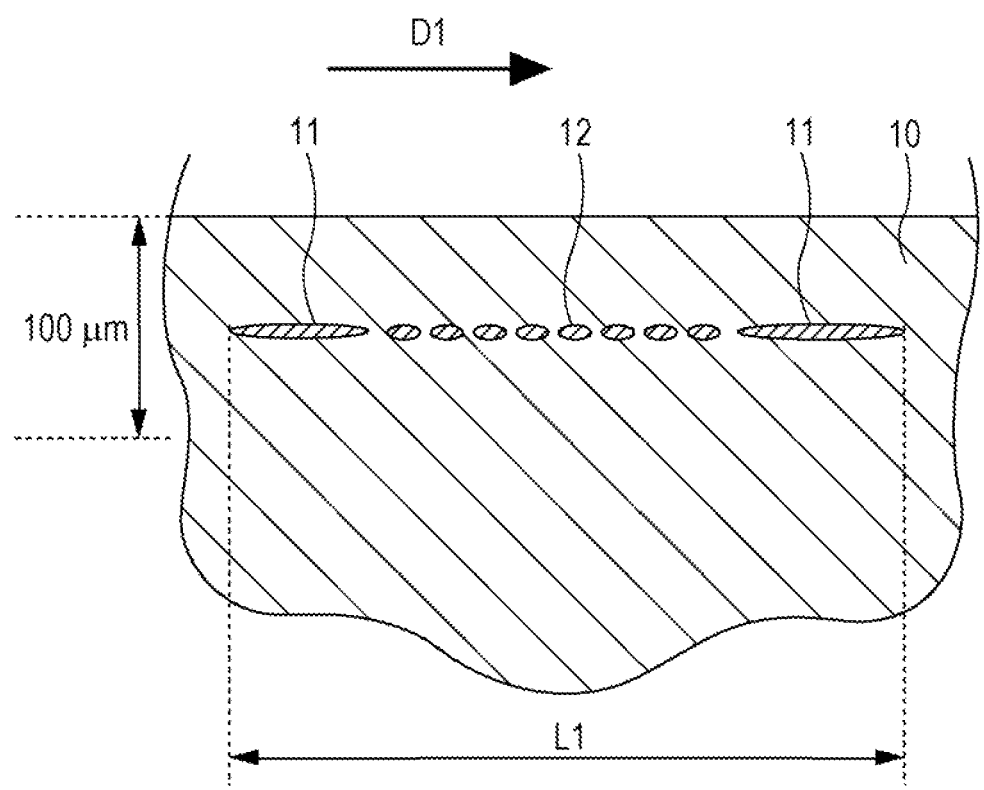

HIGH-STRENGTH STEEL SHEET AND METHOD FOR PRODUCING SAME

CROSS REFERENCE TO RELATED APPLICATIONS

This is the U.S. National Phase application of PCT/JP2019/032798, filed Aug. 22, 2019, which claims priority to Japanese Patent Application No. 2018-162572, filed Aug. 31, 2018, the disclosures of these applications being incorporated herein by reference in their entireties for all purposes.

FIELD OF THE INVENTION

The present invention relates to a high-strength steel sheet that is preferably used as a material for automotive parts and the like and which has excellent delayed fracture resistance. The present invention also relates to a method for producing the high-strength steel sheet.

BACKGROUND OF THE INVENTION

In recent years, there has been increased awareness of the need to protect the global environment, and, accordingly, improvement in fuel economy for reducing $CO_2$ emission from automobiles has been strongly demanded. In connection with this, an active effort is being made to reduce the weight of vehicle bodies by increasing a strength of a steel sheet, which is a material for automotive parts, thereby reducing a thickness of the parts. In a case where a steel sheet having a 980 MPa or greater-class tensile strength is subjected to press forming in a forming process, a delayed fracture may occur due to increased residual stress within parts and degradation of the delayed fracture resistance of the steel sheet itself. The delayed fracture is a phenomenon that occurs as follows. In a case where a part is placed in a hydrogen attack environment in a state in which a high stress is applied to the part, hydrogen enters the steel sheet that forms the part and thus reduces interatomic bonding forces. Furthermore, in a case where bending or the like is performed, a local deformation is caused. As a result of these events, microcracks are formed and propagate, and eventually, a fracture is caused. In accordance with aspects of the present invention, it is necessary to ensure excellent delayed fracture resistance that is exhibited in corrosive environments associated with immersion in concentrated acid.

In the related art, means for improving the bending workability of high-strength steel sheets have been studied in various approaches. For example, Patent Literature 1 discloses a technology for improving bendability by homogenizing the hardness distribution of a surface layer of a steel sheet by correcting an inhomogeneity of a solidification structure, the improvement being achieved despite the fact that the microstructure includes ferrite and martensite. Furthermore, in the technology described in Patent Literature 1, by using an in-mold electromagnetic stirrer or the like, a flow rate of molten steel at the solidification interface of a slab near the mold meniscus is increased, and, accordingly, the molten steel in a surface layer of the slab, which is in the process of solidification, is stirred by the flow of the molten steel; this makes it unlikely that inclusions and defects are trapped between dendrite arms, thereby inhibiting the development of an inhomogeneous solidification structure near the surface layer of the slab during casting; as a result, non-uniform changes in a structure of the surface layer of the steel sheet resulting from cold rolling and annealing due to an inhomogeneity of the solidification structure are reduced, and associated degradation of bendability is reduced.

Furthermore, the technologies of Patent Literature 2 and 3 are examples of technologies for improving the material properties of a steel sheet by controlling an amount and a shape of inclusions.

Patent Literature 2 discloses a high-strength cold-rolled steel sheet in which the metallurgical structure and an amount of inclusions are limited to improve stretch flangeability. Patent Literature 2 proposes a high-strength cold-rolled steel sheet having excellent stretch flangeability. The high-strength steel sheet has a microstructure that includes, in terms of an area fraction, 50% or greater (and 100% or less) tempered martensite having a hardness of 380 Hv or less with the balance being ferrite; in the tempered martensite, the number of cementite particles having an equivalent circular diameter of 0.1 μm or greater is 2.3 or fewer per 1 $μm^2$ of the tempered martensite; and in the entire microstructure, the number of inclusions having an aspect ratio of 2.0 or greater is 200 or fewer per 1 $mm^2$.

Furthermore, Patent Literature 3 proposes a high-strength steel sheet having excellent stretch flangeability and fatigue properties. The chemical components of the high-strength steel sheet are as follows: a total content of one or both of Ce and La is 0.001 to 0.04%; and, on a mass basis, (Ce+La)/acid-soluble Al≥0.1, and (Ce+La)/S is 0.4 to 50. Patent Literature 3 discloses that MnS, TiS, and (Mn, Ti)S precipitate on fine and hard Ce oxide, La oxide, cerium oxysulfide, and/or lanthanum oxysulfide, which are formed by deoxidation caused by the addition of Ce and/or La; the precipitated MnS, TiS, and (Mn, Ti)S are unlikely to be deformed during rolling, and, therefore, in the steel sheet, elongated coarse MnS particles are significantly reduced; and thus, when cyclic deformation or hole expansion forming is performed, these MnS-type inclusions are unlikely to act as crack initiation sites or crack propagation paths. Furthermore, Patent Literature 3 discloses that the concentration of Ce and La is to be adapted to the concentration of acid-soluble Al; as a result, the added Ce and La reduce and decompose $Al_2O_3$-based inclusions, which are formed by Al deoxidation, to form fine inclusions, and, therefore, the alumina-based oxides do not form clusters and thus do not become coarse.

Furthermore, Patent Literature 4 discloses a technology for improving delayed fracture resistance, which is achieved as follows: in mass % or mass ppm, C: 0.08 to 0.18%, Si: 1% or less, Mn: 1.2 to 1.8%, P: 0.03% or less, S: 0.01% or less, sol. Al: 0.01 to 0.1%, N: 0.005% or less, O: 0.005% or less, and B: 5 to 25 ppm are included, and in addition, at least one of Nb: 0.005 to 0.04%, Ti: 0.005 to 0.04%, and Zr: 0.005 to 0.04% is included; a relationship between Ceq and TS satisfies TS≥2270×Ceq+260, Ceq≤0.5, and Ceq=C+Si/24+Mn/6; and in the microstructure, 80% or greater martensite in terms of a volume fraction is included.

PATENT LITERATURE

PTL 1: Japanese Unexamined Patent Application Publication No. 2011-111670

PTL 2: Japanese Unexamined Patent Application Publication No. 2009-215571

PTL 3: Japanese Unexamined Patent Application Publication No. 2009-299137

PTL 4: Japanese Unexamined Patent Application Publication No. 9-111398

SUMMARY OF THE INVENTION

Unfortunately, the technology described in Patent Literature 1 presents the following problem. Since casting is carried out under the conditions in which the flow rate of the molten steel at the solidification interface near the mold meniscus is 15 cm/sec or greater, non-metallic inclusions tend to remain, and minute bending cracks may be formed near the inclusions. Thus, in an acid immersion test, a delayed fracture occurs due to such minute bending cracks, which act as initiation sites. Furthermore, a degree of Mn segregation, a maximum P concentration, and a distribution morphology of MnS are not properly controlled. Thus, excellent delayed fracture resistance, which is sought according to aspects of the present invention, cannot be achieved. Note that the expression "near the mold meniscus" means being near the meniscus to such a degree that a dendrite structure extending from a surface of a slab toward a center of the slab is formed in a case where molten steel is cast.

Furthermore, the technology described in Patent Literature 2 is a technology that improves stretch flangeability by controlling a morphology of MnS inclusions and the like. However, in Patent Literature 2, no suggestions regarding the control of oxide-based inclusions are provided, and a degree of Mn segregation, a maximum P concentration, and a distribution morphology of MnS are not properly controlled. Thus, with the technology described in Patent Literature 2, excellent delayed fracture resistance, which is sought according to aspects of the present invention, cannot be achieved.

Furthermore, the technology described in Patent Literature 3 requires the addition of particular elements such as Ce or La to control oxide-based inclusions and, therefore, significantly increases the production cost. Furthermore, a degree of Mn segregation, a maximum P concentration, and a distribution morphology of MnS are not properly controlled. Thus, with the technology described in Patent Literature 3, excellent delayed fracture resistance, which is sought according to aspects of the present invention, cannot be achieved.

Furthermore, the technology described in Patent Literature 4 is a technology for improving delayed fracture resistance, the technology being associated with a delayed fracture resistance evaluated by using an electrolysis method; therefore, the delayed fracture resistance improving effect is not necessarily sufficient in corrosive environments corresponding to immersion in concentrated hydrochloric acid having a high HCl concentration of 5 wt %. Furthermore, a degree of Mn segregation, a maximum P concentration, and a distribution morphology of MnS are not properly controlled. Thus, with the technology described in Patent Literature 4, excellent delayed fracture resistance, which is sought according to aspects of the present invention, cannot be achieved.

In such circumstances, objects according to aspects of the present invention are to provide a high-strength steel sheet having a tensile strength of 980 MPa or greater and having excellent delayed fracture resistance and to provide a method for producing the high-strength steel sheet.

First, a procedure for evaluating delayed fracture resistance in accordance with aspects of the present invention will be described. In accordance with aspects of the present invention, a specimen is prepared in which a U-bend was performed and then a stress was applied to the bent portion by tightening a bolt. Regarding the bend radius, the bending is to be performed at a minimum bend radius at which cracks are not formed as determined by visual inspection, when the bending is performed. The stress-applied specimen is produced by the first to third steps described below. Firstly, in the first step, a specimen 1 is prepared. As illustrated in FIG. 1, the specimen 1 has a slender rectangular parallelepiped shape having a width (c) of 30 mm and a length (d) of 100 mm, and the specimen 1 has two perforations 2 and machine-ground edges. Next, in the second step, bending is performed on a middle portion of the specimen 1 as illustrated in FIG. 2. Next, in the third step, as illustrated in FIG. 3, a washer 3, which is made from a fluorinated ethylene resin, is attached around the above-mentioned perforations 2, and a stainless steel bolt 4 is tightened to apply a stress to the specimen 1.

The value of the stress applied is assumed to correspond to an amount of strain applied, the amount corresponding to an elastic stress of 2000 MPa, as calculated using Hooke's law based on an amount at the time after bending, at which the bolt tightening amount is zero, and assuming that the Young's modulus is 210 GPa (in this specification, the expression "a stress of 2000 MPa is applied" may be used). In this instance, the amount of strain is measured by attaching a strain gauge having a gauge length of 1 mm to an apex of the bent portion. Nine such U-bent bolt-tightened specimens that are produced as described above are prepared and immersed in hydrochloric acid having a concentration of 5 wt %, of which the solution volume-to-specimen area ratio is 60 ml/cm$^2$. After 96 hours of immersion, if no cracks having a length of 1 mm or greater are formed in all of the nine specimens, a determination is made that excellent delayed fracture resistance has been achieved.

To solve the above-described problem related to delayed fracture resistance, the present inventors conducted studies regarding a governing factor associated with the delayed fracture resistance of high-strength steel sheets. As a result, it was found that fractures occur with various inclusions acting as initiation sites, the inclusions being present in a region within 100 μm of a surface of the steel sheet in a sheet thickness direction (in this specification, the region may be referred to as a "surface layer").

First, it was found that in a case where coarse MnS particle groups having a longitudinal dimension of 150 μm or greater are present in an amount greater than or equal to a specific amount, delayed fracture resistance is significantly degraded. Reasons for this are believed to be as follows. In hot rolling and cold rolling, MnS is elongated in a rolling direction, and, therefore, MnS exists in a state in which the aspect ratio thereof is relatively high. Consequently, an effect of the morphology itself of MnS is produced, and a notch effect is produced as a result of an event in which a local cell is formed between MnS and the base steel sheet, which promotes dissolution and corrosion of the base steel sheet. Because of these effects, a significant stress concentration is induced. In addition, the corrosion results in an increase in an amount of hydrogen produced. Accordingly, the present inventors investigated various methods for rendering a deterioration in delayed fracture resistance due to MnS harmless. As a result, the present inventors discovered that delayed fracture resistance can be improved by controlling the number of MnS particle groups having a longitudinal dimension of 150 μm or greater in a region within 100 μm of the surface in the sheet thickness direction to be 2.0 or fewer per 1 mm$^2$, as viewed in a cross section in the sheet thickness direction and parallel to the rolling direction of the steel sheet. Furthermore, regarding MnS, the present inventors discovered that the number of MnS particle groups having a longitudinal dimension of 150 μm or greater can be reduced to 2.0 or fewer per 1 mm$^2$ by reducing a S content to 0.0015 mass % or less; controlling a degree of Mn segregation in a Mn microsegregation region, which is formed during casting, to be 1.5 or less; and controlling each of the slab heating conditions and hot rolling conditions to be within a suitable range.

Furthermore, it was found that in a case where microcracks are formed during bending, delayed fractures due to the microcracks, which act as initiation sites, may occur after immersion in acid, and thus, good delayed fracture resistance cannot be achieved consistently. The initiation sites of such microcracks that occur during bending are oxide-based inclusions having a particle diameter of 5 μm or greater that are present within 100 μm of the surface of the steel sheet in the sheet thickness direction. It was discovered that reducing the number of such oxide-based inclusions to 8 or fewer per 1 mm² is effective for consistently ensuring a delayed fracture resistance.

In addition to the above, it was found that controlling a maximum P concentration to be 0.08 mass % or less produces an effect of further improving delayed fracture resistance. Reasons for this are not necessarily clear, but it is believed that the toughness of the steel sheet matrix is reduced by a P segregation region, and, therefore, in a case where a P segregation region coexists with MnS and oxide-based inclusions such as those described above, fracture initiation sites are formed.

All of these were combined. In addition, a chemical composition was adjusted, the degree of Mn segregation in a region within 100 μm of the surface in the sheet thickness direction was adjusted, and a composition of oxide-based inclusions having a particle diameter of 5 μm or greater was adjusted. With these adjustments, a high-strength steel sheet having excellent delayed fracture resistance, which is sought according to aspects of the present invention, was obtained. Accordingly, the aspects of the present invention were completed.

Aspects of the present invention were completed based on the findings described above, and a summary thereof is as follows.

[1] A high-strength steel sheet, the high-strength steel sheet having a chemical composition containing, in mass %,
  C: 0.10 to 0.35%,
  Si: 0.01 to 2.0%,
  Mn: 1.5 to less than 2.2%,
  P: 0.015% or less (and greater than 0%),
  S: 0.0015% or less (and greater than 0%),
  Sol. Al: 0.01 to 1.0%,
  N: 0.0055% or less (and greater than 0%),
  O: 0.0025% or less (and greater than 0%), and
  Ca: 0.0005% or less (and 0% or greater), with the balance being Fe and incidental impurities, wherein
  in a region within 100 μm of a surface of the high-strength steel sheet in a sheet thickness direction, a degree of Mn segregation is 1.5 or less,
  in a region within 100 μm of the surface in the sheet thickness direction, a maximum P concentration is 0.08 mass % or less,
  in a region within 100 μm of the surface in the sheet thickness direction, at least one MnS particle group formed of one or more MnS particles having a major axis of 0.3 μm or greater is present, the one or more MnS particles being elongated and/or distributed in a form of a sequence of dots in a rolling direction of the steel sheet, a distance between adjacent MnS particles being 40 μm or less in a case where the at least one MnS particle group is formed of two or more MnS particles, and a number of MnS particle groups having a longitudinal dimension of 150 μm or greater is 2.0 or fewer per 1 mm², as viewed in a cross section in a sheet thickness direction and parallel to the rolling direction,
  in a region within 100 μm of the surface in the sheet thickness direction, a number of oxide-based inclusions having a particle diameter of 5 μm or greater is 8 or fewer per 1 mm² as viewed in a plane parallel to a sheet surface,
  of all the number of the oxide-based inclusions having a particle diameter of 5 μm or greater, oxide-based inclusions having a composition in which an alumina content is 50 mass % or greater, a silica content is 20 mass % or less, and a calcia content is 40 mass % or less are present in the number ratio of 80% or greater,
  the high-strength steel sheet has a microstructure that includes, in terms of a volume fraction, 30 to 95% martensite, 5 to 70% ferrite phase, less than 30% (and 0% or greater) bainite, and less than 2.0% (and 0% or greater) austenite phase, and
  the high-strength steel sheet has a tensile strength of 980 MPa or greater.

[2] The high-strength steel sheet according to [1], wherein the chemical composition further contains, in mass %, at least one of
  Ti: 0.003 to 0.05%,
  Nb: 0.003 to 0.05%,
  V: 0.001 to 0.1%, and
  Zr: 0.001 to 0.1%.

[3] The high-strength steel sheet according to [1] or [2], wherein the chemical composition further contains, in mass %,
at least one of
  Cr: 0.01 to 1.0%,
  Mo: 0.01 to 0.20%, and
  B: 0.0001 to 0.0030%.

[4] The high-strength steel sheet according to any one of [1] to [3], wherein the chemical composition further contains, in mass %, at least one of
  Cu: 0.01 to 0.5%,
  Ni: 0.01 to 0.5%, and
  Sn: 0.001 to 0.1%.

[5] The high-strength steel sheet according to any one of [1] to [4], wherein the chemical composition further contains, in mass %, Sb: 0.001 to 0.1%.

[6] The high-strength steel sheet according to any one of [1] to [5], wherein the chemical composition further contains, in mass %, at least one of REMs and Mg in a total amount of 0.0002% or greater and 0.01% or less.

[7] The high-strength steel sheet according to any one of [1] to [6], further including a galvanized layer on the surface.

[8] A method for producing a high-strength steel sheet, the high-strength steel sheet being the high-strength steel sheet according to any one of [1] to [6], the method including:
  a casting step in which, after completion of refining, which is carried out in an RH vacuum degasser with a circulation time of 500 seconds or more, continuous casting is performed in a manner such that a difference between a casting temperature and a solidification temperature is 10° C. or greater and 35° C. or less, a flow rate of molten steel at a solidification interface near a mold meniscus is 0.5 to 1.5 m/min, and the steel is passed through a bending section and a straightening section at a temperature of 550° C. or higher and 1050° C. or lower;
  a hot rolling step in which a steel starting material obtained in the casting step is heated directly after the casting step or after cooling to a temperature of 1220 to 1300° C. and held for 80 minutes or more; and hot rolling is performed in a manner such that an amount of reduction for a first pass of rough rolling is 10% or greater, and an amount of reduction for a first pass of finish rolling is 20% or greater;

a cold rolling step in which, after a hot-rolled steel sheet obtained in the hot rolling step is pickled, the hot-rolled steel sheet is subjected to cold rolling; and an annealing step in which a cold-rolled steel sheet obtained in the cold rolling step is annealed.

[9] The method for producing a high-strength steel sheet according to [8], wherein the annealing step is a step performed in a manner such that the cold-rolled steel sheet obtained in the cold rolling step is heated to a temperature range of 780 to 900° C.; thereafter, the steel sheet is soaked in the temperature range for 20 seconds or more; then, primary cooling is performed to cool the steel sheet from the soaking temperature to a rapid cooling start temperature of 580° C. or higher at an average primary cooling rate of 1 to 100° C./s; thereafter, secondary cooling is performed to cool the steel sheet from the rapid cooling start temperature to 300° C. or lower at an average secondary cooling rate of 80° C./sec or greater and less than 2000° C./sec, the average secondary cooling rate being an average cooling rate for a range from the rapid cooling start temperature to 300° C.; then, the steel sheet is held under conditions including a retention time for a temperature range of 450 to 130° C. of 10 to 1000 seconds; and then, tertiary cooling is performed to cool the steel sheet over a temperature range of 130 to 50° C. at an average tertiary cooling rate of 5° C./sec or greater.

[10] The method for producing a high-strength steel sheet according to [8] or [9], further including a galvanizing step in which galvanizing is performed on the steel sheet resulting from the annealing step.

In accordance with aspects of the present invention, the numbers of various oxide-based inclusions and MnS particle groups present in a surface layer of a steel sheet (a region within 100 μm of a surface of a steel sheet) are reduced, a composition of the oxide-based inclusions is controlled to be within a suitable range, and a degree of Mn segregation and a maximum P concentration are reduced to be within a suitable range; accordingly, high-strength steel sheets having excellent delayed fracture resistance, which are suitable as a material for automotive parts such as automotive structural members, are provided.

With the use of a high-strength steel sheet according to aspects of the present invention or a high-strength steel sheet produced by a production method according to aspects of the present invention, an improvement in automobile collision safety is achieved, and an improvement in fuel economy due to a reduction in the weight of automotive parts is achieved.

BRIEF DESCRIPTION OF THE DRAWINGS

FIG. 6 is a schematic diagram illustrating an example of an instance in which a MnS particle group is formed of one or more MnS particles elongated in a rolling direction and one or more MnS particles distributed in the form of a sequence of dots in the rolling direction.

DETAILED DESCRIPTION OF EMBODIMENTS OF THE INVENTION

Figure 1:
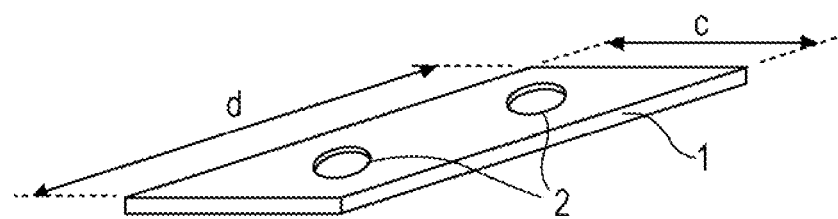
FIG. 1 is a schematic diagram illustrating a first step of a procedure for evaluating delayed fracture resistance.
Figure 2:
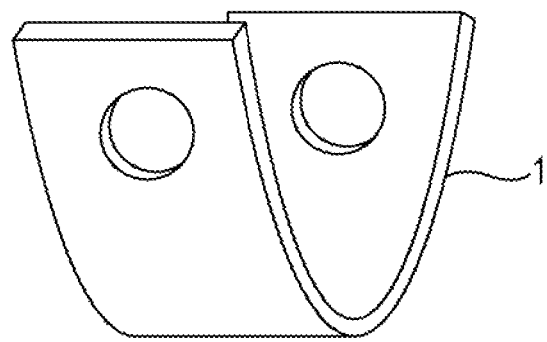
FIG. 2 is a schematic diagram illustrating a second step of the procedure for evaluating delayed fracture resistance.
Figure 3:
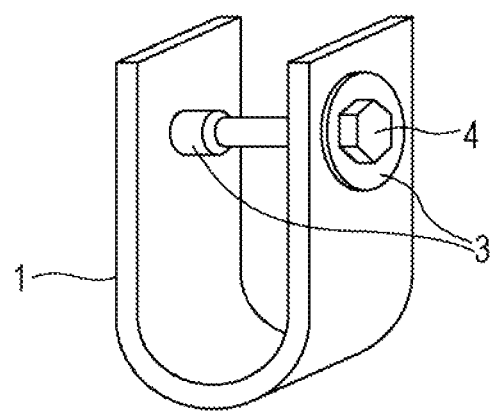
FIG. 3 is a schematic diagram illustrating a third step of the procedure for evaluating delayed fracture resistance.

Embodiments of the present invention will now be described. Note that the present invention is not limited to the embodiments described below.

<High-Strength Steel Sheet>

First, a chemical composition of a high-strength steel sheet according to aspects of the present invention will be described. Note that as used in accordance with aspects of the present invention, the term "high-strength" means a tensile strength of 980 MPa or greater.

Each of the components will be described in detail below. In the following description, "%" used to indicate a content of a component means "mass %".

C: 0.10 to 0.35%

C is an important element for strengthening martensite, which is the hardened structure. If a C content is less than 0.10%, a sufficient strength-increasing effect is not produced. Accordingly, the C content is specified to be greater than or equal to 0.10%. The C content is preferably greater than or equal to 0.12% and more preferably greater than or equal to 0.14%. On the other hand, if the C content is greater than 0.35%, strength increases excessively, and, consequently, delayed fracture resistance is significantly degraded. Furthermore, in a cross tension test for spot welding, weld breakage occurs, and thus, bonding strength is significantly decreased. Accordingly, the C content is specified to be less than or equal to 0.35%. The C content is preferably less than or equal to 0.30% and more preferably less than or equal to 0.24%.

Si: 0.01 to 2.0%

Si is effective for increasing the ductility of high-strength steel sheets. Furthermore, Si has an effect of inhibiting decarburization in the surface layer, thereby improving fatigue properties. Accordingly, a Si content is specified to be greater than or equal to 0.01%. From the standpoint of improving ductility and fatigue properties, it is preferable that the Si content be greater than or equal to 0.10%. The Si content is more preferably greater than or equal to 0.20% and even more preferably greater than or equal to 0.40%. On the other hand, if Si is included in an amount greater than 2.0%, it is difficult to control a composition of oxides to be within a specific range, and, consequently, delayed fracture resistance is degraded. Furthermore, Si has an effect of degrading weldability. Accordingly, the Si content is specified to be less than or equal to 2.0%. From the standpoint of improving delayed fracture resistance and weldability, it is preferable that the Si content be less than or equal to 1.5%. The Si content is more preferably less than 1.0% and even more preferably less than 0.8%.

Mn: 1.5 to Less than 2.2%

Mn increases the strength of high-strength steel sheets. If a Mn content is less than 1.5%, an amount of ferrite formed during annealing cooling increases, and pearlite also tends to be formed, and, consequently, sufficient strength is not achieved. Accordingly, the Mn content is specified to be greater than or equal to 1.5%. The Mn content is preferably greater than or equal to 1.6% and more preferably greater than or equal to 1.7%. If the Mn content is greater than or equal to 2.2%, however, a proportion of coarse MnS increases, and, therefore, the number of MnS particle groups having a longitudinal dimension of 150 μm or greater exceeds 2.0 per 1 mm$^2$; consequently, excellent delayed fracture resistance, which is sought according to aspects of the present invention, cannot be achieved. Accordingly, the Mn content is specified to be less than 2.2%. The Mn content is preferably less than or equal to 2.1% and more preferably less than or equal to 2.0%.

P: 0.015% or Less (and Greater than 0%)

In accordance with aspects of the present invention, P is an impurity. In accordance with aspects of the present invention, ensuring a P content of 0.015% or less is an important requirement because if a maximum P concentration of a microsegregation region, which is formed during casting, increases, delayed fracture resistance is degraded. If the P content is greater than 0.015%, it becomes difficult to control the maximum P concentration in the surface layer to be 0.08 mass % or less, and, consequently, excellent delayed fracture resistance, which is sought according to aspects of the present invention, cannot be achieved. Accordingly, it is necessary that the P content be less than or equal to 0.015%. The P content is preferably less than or equal to 0.010% and more preferably less than or equal to 0.008%. It is preferable to remove as much P as possible. However, if the P content is less than 0.003%, a delayed fracture resistance improving effect no longer increases, and productivity is significantly impaired. Accordingly, it is preferable that the P content be greater than or equal to 0.003%.

S: 0.0015% or Less (and Greater than 0%)

In accordance with aspects of the present invention, S is an impurity in the steel according to aspects of the present invention. S combines with Mn to form MnS. The presence of coarse MnS particles significantly degrades delayed fracture resistance. Accordingly, in accordance with aspects of the present invention, ensuring a S content of 0.0015% or less is a particularly important requirement. If the S content is greater than 0.0015%, the number of coarse MnS particle groups having a longitudinal dimension of 150 μm or greater increases, and, consequently, excellent delayed fracture resistance, which is sought according to aspects of the present invention, cannot be achieved. Accordingly, it is necessary to ensure that the S content is less than or equal to 0.0015%. It is preferable to remove as much S as possible. The S content is preferably less than or equal to 0.0010%, more preferably less than or equal to 0.0008%, and even more preferably less than or equal to 0.0005%. On the other hand, reducing the S content to less than 0.0002% significantly impairs productivity, and, therefore, the S content is preferably greater than or equal to 0.0002%.

Sol. Al: 0.01 to 1.0%

If a Sol. Al content is less than 0.01%, a sufficient deoxidation and denitrification effect is not produced. Accordingly, the Sol. Al content is specified to be greater than or equal to 0.01%. Preferably, the Sol. Al content is greater than or equal to 0.02%. Furthermore, similarly to Si, Sol. Al is a ferrite-forming element, and, therefore, Sol. Al is added in a case where a microstructure containing ferrite is desired. On the other hand, if the Sol. Al content is greater than 1.0%, it becomes difficult to ensure a tensile strength of 980 MPa consistently. Furthermore, delayed fracture resistance is degraded. Accordingly, the Sol. Al content is specified to be less than or equal to 1.0%. The Sol. Al content is preferably less than or equal to 0.5% and more preferably less than or equal to 0.1%. Note that as used herein, the term "Sol. Al" refers to acid-soluble aluminum, and the Sol. Al content is an Al content corresponding to a total Al content of the steel minus a content of Al that is present as an oxide.

N: 0.0055% or Less (and Greater than 0%)

N is an impurity present in crude steel. Since N degrades the formability of steel sheets, a N content is specified to be less than or equal to 0.0055%. The N content is preferably less than or equal to 0.0050% and more preferably less than or equal to 0.0045%. On the other hand, if a N content of less than 0.0006% is to be achieved, the refining cost significantly increases. Accordingly, it is preferable that the N content be greater than or equal to 0.0006%.

O: 0.0025% or less (and greater than 0%)

O is in the form of a metal oxide or the like, which is formed during refining and remains in steel as inclusions. In accordance with aspects of the present invention, as will be described later, a composition of oxide-based inclusions is properly controlled, and as a result, delayed fracture resistance is improved in association with bending workability. If an O content is greater than 0.0025%, the frequency of occurrence of microcracking during bending significantly increases, and as a result, delayed fracture resistance is degraded. Accordingly, the O content is specified to be less than or equal to 0.0025%. The O content is preferably less than or equal to 0.0020% and more preferably less than or equal to 0.0014%. On the other hand, if an O content of less than 0.0008% is to be achieved, the refining cost significantly increases. Hence, to inhibit an increase in refining cost, it is preferable to ensure that the O content is greater than or equal to 0.0008%.

Ca: 0.0005% or Less (and 0% or Greater)

Ca is an impurity present in crude steel. Ca reacts with oxygen to form an oxide and reacts with a different oxide to form a complex oxide. Such oxides, if present in steel, can result in a defect in a steel sheet and/or degrade delayed fracture resistance in association with bendability. Accordingly, it is necessary that a Ca content be less than or equal to 0.0005%. The Ca content is preferably less than or equal to 0.0003% and more preferably less than or equal to 0.0002%.

The steel sheet according to aspects of the present invention has a chemical composition that includes the components described above with the balance, other than the components described above, including Fe (iron) and incidental impurities. It is preferable that the steel sheet according to aspects of the present invention have a chemical composition that includes the components described above with the balance consisting of Fe and incidental impurities. Furthermore, the chemical composition of the steel sheet according to aspects of the present invention may further include optional elements described below depending on a purpose, in addition to the elements described above.

At Least One of Ti: 0.003 to 0.05%, Nb: 0.003 to 0.05%, V: 0.001 to 0.1%, and Zr: 0.001 to 0.1%

Ti, Nb, V, and Zr each form a carbide and a nitride in steel during casting and hot rolling processes, thereby inhibiting coarsening of a grain diameter and thus producing an effect of inhibiting propagation of cracks caused by working. To produce such an effect, it is preferable to include Ti, Nb, V, and/or Zr each in an amount greater than or equal to the lower limit mentioned above. A Ti content is more preferably greater than or equal to 0.02%. A Nb content is more preferably greater than or equal to 0.02%. A V content is more preferably greater than or equal to 0.003% and even more preferably greater than or equal to 0.006%. A Zr content is more preferably greater than or equal to 0.003% and even more preferably greater than or equal to 0.006%. It should be noted that if any of these elements is added in an excessive amount, an amount of precipitation of carbonitrides increases, and when a slab is heated, coarse precipitates remain undissolved, which results in a decrease in the formability of a product. Accordingly, it is preferable to include Ti, Nb, V, and/or Zr in an amount less than or equal to the upper limit mentioned above. The Ti content is more preferably less than or equal to 0.04%. The Nb content is more preferably less than or equal to 0.04%. The V content is more preferably less than or equal to 0.050% and even more preferably less than or equal to 0.010%. The Zr content is more preferably less than or equal to 0.050% and even more preferably less than or equal to 0.010%.

At Least One of Cr: 0.01 to 1.0%, Mo: 0.01 to 0.20%, and B: 0.0001 to 0.0030%

Cr, Mo, and B are elements effective for improving hardenability, thereby achieving a tensile strength of 980 MPa or greater consistently. To produce the effect, it is preferable to include at least one of the elements. In cases where any of these elements is included in an amount greater than or equal to the lower limit, the above-described effect is produced. A Cr content is more preferably greater than or equal to 0.1%. A Mo content is more preferably greater than or equal to 0.05%. A B content is more preferably greater than or equal to 0.0003%. On the other hand, Cr, Mo, and B each can degrade ductility if the upper limit mentioned above is exceeded. Accordingly, contents less than or equal to the upper limits mentioned above are preferable. The Cr content is more preferably less than or equal to 0.7%. The Mo content is more preferably less than or equal to 0.15%. The B content is more preferably less than or equal to 0.0020%.

At Least One of Cu: 0.01 to 0.5%, Ni: 0.01 to 0.5%, and Sn: 0.001 to 0.1%

Cu, Ni, and Sn have an effect of improving the corrosion resistance of steel sheets, thereby increasing delayed fracture resistance thereof. To produce the effect, it is preferable to include at least one of the elements. A Cu content of greater than or equal to 0.01%, a Ni content of greater than or equal to 0.01%, and a Sn content of greater than or equal to 0.001% each independently produce the above-mentioned effect. Accordingly, it is preferable that the Cu content be greater than or equal to 0.01%, the Ni content be greater than or equal to 0.01%, and the Sn content be greater than or equal to 0.001%. More preferably, the Cu content is greater than or equal to 0.05%, the Ni content is greater than or equal to 0.05%, and the Sn content is greater than or equal to 0.005%. On the other hand, in the case where at least one of Cu, Ni, and Sn is included, if the Cu content is greater than 0.5%, the Ni content is greater than 0.5%, and/or the Sn content is greater than 0.1%, embrittlement occurs during casting and hot rolling, which results in a surface defect. Accordingly, it is preferable that the Cu content be less than or equal to 0.5%, the Ni content be less than or equal to 0.5%, and the Sn content be less than or equal to 0.1%. More preferably, the Cu content is less than or equal to 0.2%, the Ni content is less than or equal to 0.2%, and the Sn content is less than or equal to 0.050%.

Sb: 0.001 to 0.1%

In an annealing process of continuous annealing, Sb becomes concentrated in a surface layer of a steel sheet, thereby inhibiting reductions in the C content and the B content of the surface layer of the steel sheet. To produce the effect, it is preferable that an Sb content be greater than or equal to 0.001%. The Sb content is more preferably greater than or equal to 0.003%. On the other hand, if the Sb content is greater than 0.1%, the effect no longer increases, and in addition, toughness may be degraded by grain boundary segregation of Sb. Accordingly, it is preferable that the Sb content be less than or equal to 0.1%. The Sb content is more preferably less than or equal to 0.015%.

At Least One of REMs and Mg in a Total Amount of 0.0002% or Greater and 0.01% or Less These elements are useful elements for improving formability because these elements refine inclusions, thereby reducing fracture initiation sites. In a case where any of these elements is added, if a total content thereof is less than 0.0002%, the effect described above cannot be produced effectively. On the other hand, if the total content is greater than 0.01%, inclusions may coarsen contrarily, which may reduce formability. Accordingly, it is preferable that the total content of at least one of REMs and Mg be 0.0002% or greater and 0.01% or less. As used herein, the term "REMs" refers to the total 17 elements of Sc, Y, and the lanthanides. In a case where lanthanides are used, the lanthanides are added in the form of a misch metal, industrially. In accordance with aspects of the present invention, the content of REMs is the total content of any of these elements.

Note that in the steel sheet according to aspects of the present invention, the balance, other than the components described above, is Fe and incidental impurities. In a case where any of the optional elements described above, which may be included optionally, is present in an amount less than the lower limit mentioned above, the elements are regarded as incidental impurities because in such a case, the elements do not impair the effects according to aspects of the present invention.

Now, reasons for the limitations on the degree of Mn segregation of the surface layer of the steel sheet according to aspects of the present invention and the maximum P concentration thereof will be described.

Degree of Mn Segregation in Region within 100 µm of Surface in Sheet Thickness Direction is 1.5 or Less In accordance with aspects of the present invention, the degree of Mn segregation is a maximum Mn amount in a region of the steel sheet versus an average Mn amount in the steel sheet, excluding the centerline segregation zone (degree of Mn segregation=(maximum Mn amount/average Mn amount)). The region is a region (a vertical cross section along a rolling direction) extending from a depth of 10 µm to a depth of 100 µm with respect to a surface, in a sheet thickness direction. The measured values of a region within a depth of less than 10 µm of the outermost surface include measurement errors inherent in a measurement of a surface and are, therefore, excluded from the measurements. Controlling the degree of Mn segregation is one of the most important requirements for achieving excellent delayed fracture resistance, which is sought according to aspects of the present invention.

In a case where the degree of Mn segregation is measured, an EPMA (electron probe micro analyzer) is used to measure a Mn concentration distribution of the steel sheet. The degree of Mn segregation varies with the EPMA measurement conditions. Accordingly, in accordance with aspects of the present invention, evaluations are made as follows. The following fixed conditions are used: an acceleration voltage of 15 kV, a probe current of 2.5 µA, an irradiation time of 0.05 s/point, a probe diameter of 1 µm, and a measurement pitch of 1 µm. In addition, a measurement area of 45000 µm$^2$ (90 µm (depth direction)×500 µm (rolling direction)) is specified. From the obtained data, an averaging data value is calculated for each of 3 µm×3 µm regions, and the value is designated as the measurement data of the region. In accordance with aspects of the present invention, each of the evaluation regions has a size of 3 µm×3 µm. Note that if inclusions, such as MnS particles, are present, an apparent maximum degree of Mn segregation increases, and, therefore, in a case where inclusions are encountered, the corresponding value is excluded for evaluations.

If the degree of Mn segregation is greater than 1.5, a proportion of coarse MnS particles increases, and a fracture strength of the segregation region decreases, and, consequently, cracks propagate along the segregation. Accordingly, the degree of Mn segregation is specified to be less than or equal to 1.5. Preferably, the degree of Mn segregation is less than or equal to 1.3.

Furthermore, the lower limit of the degree of Mn segregation is not particularly limited, and it is preferable that the value of the degree of Mn segregation be as low as possible. Typically, the degree of Mn segregation is not less than 1.0.

Note that Mn segregation present in regions that are closer to the center of a sheet thickness than a position 100 μm from the surface of the steel sheet in the sheet thickness direction is has little influence on delayed fracture resistance, which is sought according to aspects of the present invention, and, therefore, in accordance with aspects of the present invention, no restrictions are imposed on such Mn segregation.

Maximum P concentration in Region within 100 μm of Surface in Sheet Thickness Direction is 0.08 mass % or Less In accordance with aspects of the present invention, the maximum P concentration is a maximum P concentration in a region of the steel sheet, excluding the centerline segregation zone. The region is a region (a vertical cross section along a rolling direction) extending from a depth of 10 μm to a depth of 100 μm with respect to the surface, in the sheet thickness direction. The measured values of a region within a depth of less than 10 μm of the outermost surface include measurement errors inherent in a measurement of a surface and are, therefore, excluded from the measurements. Controlling the maximum P concentration is one of the important requirements for achieving excellent delayed fracture resistance, which is sought according to aspects of the present invention.

In a case where the maximum P concentration is measured, an EPMA (electron probe micro analyzer) is used to measure a P concentration distribution of the steel sheet. The maximum P concentration varies with the EPMA measurement conditions. Accordingly, in accordance with aspects of the present invention, evaluations are made as follows. The following fixed conditions are used: an acceleration voltage of 15 kV, a probe current of 2.5 μA, an irradiation time of 0.05 s/point, a probe diameter of 1 μm, and a measurement pitch of 1 μm. In addition, a measurement area of 45000 μm$^2$ (90 μm (depth direction)×500 μm (rolling direction)) is specified. From the obtained data, an averaging data value is calculated for each of 3 μm×3 μm regions, and the value is designated as the measurement data of the region. In accordance with aspects of the present invention, each of the evaluation regions has a size of 3 μm×3 μm.

If the maximum P concentration increases, a fracture strength of the region having the maximum concentration decreases, and, consequently, cracks propagate along the region having a high concentration. If the maximum P concentration is greater than 0.08 mass %, significant crack propagation from cracks due to coarse MnS particles, which act as initiation sites, occurs in an immersion delayed fracture test, and, consequently, excellent delayed fracture resistance, which is sought according to aspects of the present invention, cannot be achieved. Accordingly, the maximum P concentration is specified to be less than or equal to 0.08 mass %. The maximum P concentration is preferably less than or equal to 0.06 mass % and more preferably less than or equal to 0.05 mass %.

Furthermore, the lower limit of the maximum concentration is not particularly limited, and it is preferable that the maximum P concentration be as low as possible. Typically, the maximum P concentration is not less than 0.01 mass % in many cases.

Note that although it is preferable that P segregation present in regions that are closer to the center of the sheet thickness than a position 100 μm from the surface of the steel sheet in the sheet thickness direction be also reduced; however, such P segregation has little influence on delayed fracture resistance, which is sought according to aspects of the present invention, and, therefore, in accordance with aspects of the present invention, no restrictions are imposed on such P segregation.

Reasons for the limitations on MnS will now be described.

In the steel sheet according to aspects of the present invention, in a region within 100 μm of the surface in the sheet thickness direction, at least one MnS particle group formed of one or more MnS particles having a major axis of 0.3 μm or greater is present, the one or more MnS particles being elongated and/or distributed in the form of a sequence of dots in the rolling direction, a distance between adjacent MnS particles being 40 μm or less in a case where the at least one MnS particle group is formed of two or more MnS particles, and the number of MnS particle groups having a longitudinal dimension of 150 μm or greater is 2.0 or fewer per 1 mm$^2$, as viewed in a cross section in the sheet thickness direction and parallel to the rolling direction of the steel sheet. The "MnS particle group" is one that includes at least one MnS particle group formed of one or more MnS particles having a major axis of 0.3 μm or greater that are elongated and/or distributed in the form of a sequence of dots in the rolling direction; in a case where the at least one MnS particle group is formed of two or more MnS particles, a distance between adjacent MnS particles is 40 μm or less. Note that as used in accordance with aspects of the present invention, the term "major axis" of MnS particles means the major axis of a circle-equivalent ellipse.

Figure 4:
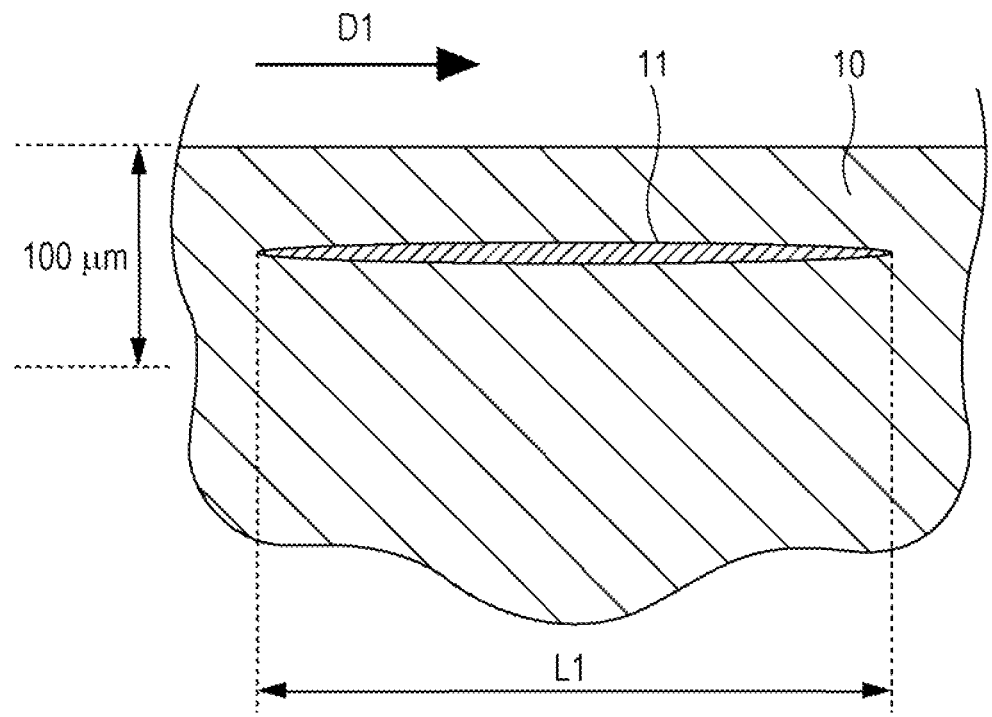
FIG. 4 is a schematic diagram illustrating an example of an instance in which a MnS particle group is formed of one or more MnS particles elongated in a rolling direction.
Figure 5:
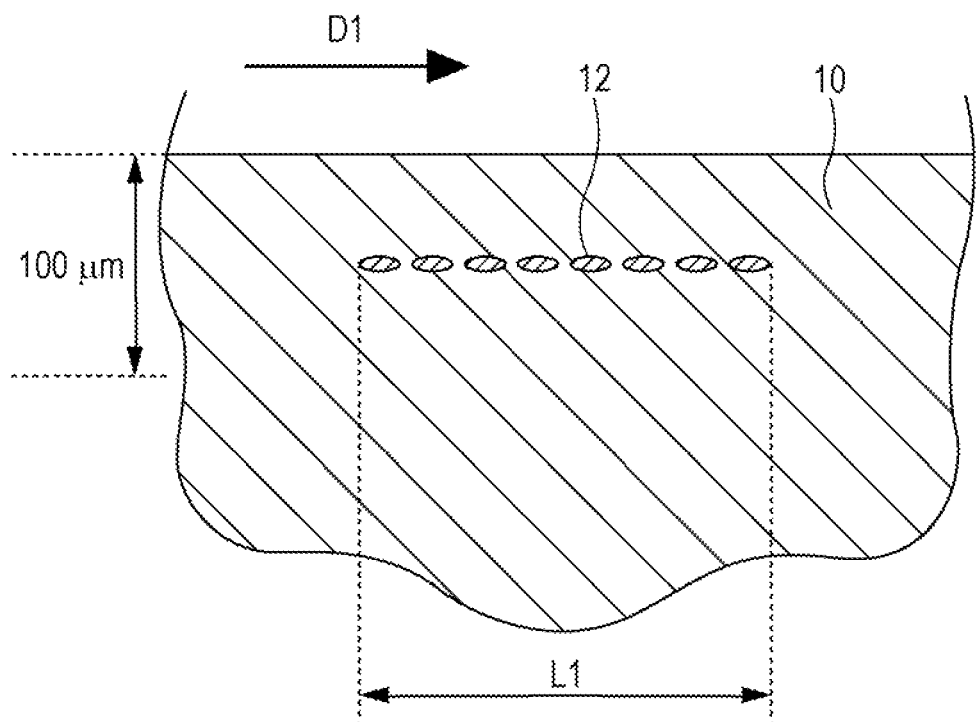
FIG. 5 is a schematic diagram illustrating an example of an instance in which a MnS particle group is formed of one or more MnS particles distributed in the form of a sequence of dots in a rolling direction.

The MnS particle group will be described with reference to FIGS. 4 to 6. FIGS. 4 to 6 illustrate cross sections in the sheet thickness direction and parallel to a rolling direction D1 of a steel sheet 10.

As described above, the MnS particle group is formed of one or more MnS particles that are elongated and/or distributed in the form of a sequence of dots in the rolling direction. That is, regarding the MnS particles that form the MnS particle group, any one of the following instances (1) to (3) is possible.

(1) One or more MnS particles that are elongated in the rolling direction (2) One or more MnS particles that are distributed in the form of a sequence of dots in the rolling direction (3) MnS particles including one or more MnS particles that are elongated in the rolling direction and one or more MnS particles that are distributed in the form of a sequence of dots in the rolling direction An example of the instance (1) is illustrated in FIG. 4. FIG. 4 illustrates a MnS particle 11 present in a region within 100 μm of the surface of the steel sheet. The MnS particle 11 is elongated in the rolling direction D1 as viewed in a cross section in the sheet thickness direction and parallel to the rolling direction D1 of the steel sheet 10.

An example of the instance (2) is illustrated in FIG. 5. FIG. 5 illustrates a plurality of MnS particles 12 present in a region within 100 μm of the surface of the steel sheet. The plurality of MnS particles 12 are distributed in the form of a sequence of dots in the rolling direction D1 as viewed in a cross section in the sheet thickness direction and parallel to the rolling direction D1 of the steel sheet 10.

An example of the instance (3) is illustrated in FIG. 6. FIG. 6 illustrates an instance in which MnS particles 11 and a plurality of MnS particles 12 are sequentially present in a region within 100 μm of the surface of the steel sheet. The MnS particles 11 are elongated in the rolling direction D1, and the plurality of MnS particles 12 are distributed in the form of a sequence of dots in the rolling direction D1, as viewed in a cross section in the sheet thickness direction and parallel to the rolling direction D1 of the steel sheet 10.

Furthermore, each of these MnS particles has a major axis of greater than or equal to 0.3 μm. Furthermore, in FIGS. 5 and 6, in each of which the MnS particle group is formed of two or more MnS particles, a distance between adjacent MnS particles is less than or equal to 40 μm.

Controlling the existence morphology of the MnS particles to be within the above-mentioned ranges is one of the most important requirements for achieving excellent delayed fracture resistance, which is sought according to aspects of the present invention. MnS particle groups present in regions that are closer to the center of the sheet thickness than a position 100 μm from the surface of the steel sheet in the sheet thickness direction is and MnS particle groups having a longitudinal dimension of less than 150 μm have little influence on delayed fracture resistance, and, therefore, in accordance with aspects of the present invention, it is not necessary to control such MnS particle groups. Accordingly, MnS particle groups present in a region within 100 μm of the surface of the steel sheet in the sheet thickness direction and having a longitudinal dimension of 150 μm or greater are to be limited as described below.

In the case where the MnS particle group is formed of one MnS particle, the longitudinal dimension of the MnS particle group is a length of the particle in the rolling direction. In the case where the MnS particle group is formed of two or more MnS particles, the longitudinal dimension of the MnS particle group is the maximum length between two points in the rolling direction, the two points being on the peripheries of the particles present at opposite ends in the rolling direction. FIGS. 4 to 6 respectively illustrate a longitudinal dimension L1 of the MnS particle group of the instances (1) to (3) (see FIGS. 4 to 6).

In a region within 100 μm of the surface of the steel sheet in the sheet thickness direction, if the number of MnS particle groups having a longitudinal dimension of 150 μm or greater is more than 2.0 per 1 mm$^2$ as viewed in a cross section in the sheet thickness direction and parallel to the rolling direction of the steel sheet, an effect of the morphology itself of the MnS particles is produced, and a notch effect is produced as a result of an event in which a local cell is formed between the MnS particles and the base steel sheet, which promotes dissolution and corrosion of the base steel sheet. Because of these effects, a significant stress concentration is induced at the interface between the base steel sheet and MnS. In addition, the promotion of corrosion results in an increase in an amount of hydrogen produced per unit time. As a result, excellent delayed fracture resistance, which is sought according to aspects of the present invention, cannot be achieved. Accordingly, the number of the MnS particle groups is specified to be fewer than or equal to 2.0 per 1 mm$^2$. Preferably, the number of the MnS particle groups is fewer than or equal to 1.5 per 1 mm$^2$. Note that the number of the MnS particle groups may be 0 per 1 mm$^2$. Note that as a result of rolling, MnS is elongated and has a thin plate shape morphology, and, therefore, evaluations regarding a size of inclusions in accordance with aspects of the present invention are made by using a particle length in the rolling direction as viewed in a cross section in the sheet thickness direction and parallel to the rolling direction of the steel sheet. That is, the length in the rolling direction corresponds to the longitudinal dimension of the particle. Furthermore, the measurement is conducted by using an SEM (scanning electron microscope), and evaluations are made with an evaluation area of 3 mm$^2$ (100 μm (depth direction)×30000 μm (rolling direction)).

Furthermore, regarding the number of MnS particle groups having a longitudinal dimension of 150 μm or greater per 1 mm$^2$ in a region within 100 μm of the surface of the steel sheet in the sheet thickness direction, as viewed in a cross section in the sheet thickness direction and parallel to the rolling direction of the steel sheet, the lower limit of the number is not particularly limited, and it is preferable that the number be as small as possible. Typically, the number is not fewer than 0.2 in many cases.

In addition, reasons for the limitations on oxide-based inclusions will be described.

In accordance with aspects of the present invention, in a region within 100 μm of the surface of the steel sheet in the sheet thickness direction, the number of oxide-based inclusions having a particle diameter of 5 μm or greater is fewer than or equal to 8 per 1 mm$^2$, and of all of the oxide-based inclusions, the number ratio of oxide-based inclusions having a composition in which an alumina content is 50 mass % or greater, a silica content is 20 mass % or less, and a calcia content is 40 mass % or less is 80% or greater.

Controlling the morphology and composition of oxide-based inclusions to be within the above-mentioned ranges is one of the important requirements for achieving excellent delayed fracture resistance, which is sought according to aspects of the present invention. Oxide-based inclusions present in regions that are closer to the sheet thickness middle than a position 100 μm from the surface of the steel sheet in the sheet thickness direction is and oxide-based inclusions having a particle diameter of less than 5 μm have little influence on delayed fracture resistance, and, therefore, in accordance with aspects of the present invention, it is not necessary to control such oxide-based inclusions. Accordingly, the oxide-based inclusions present in a region within 100 μm of the surface of the steel sheet in the sheet thickness direction and having a particle diameter of 5 μm or greater are to be limited as described below. Note that the particle diameter is a length of the diameter of an equivalent circular diameter.

In a region within 100 μm of the surface of the steel sheet in the sheet thickness direction, if the number of oxide-based inclusions having a particle diameter of 5 μm or greater is more than 8 per 1 mm$^2$ as viewed in a plane parallel to a sheet surface that contains the rolling direction of the steel sheet, microcracks are formed around inclusions in the steel sheet during bending, and, therefore, in an immersion test, cracks propagate from the microcracks, which results in cracking of the steel sheet. Accordingly, the number of the inclusions is specified to be fewer than or equal to 8 per 1 mm$^2$. In accordance with aspects of the present invention, the distribution of oxide-based inclusions within 100 μm of the surface of the steel sheet in a depth direction (the sheet thickness direction) is, typically, substantially uniform, and, accordingly, the evaluations may be made by using an arbitrary cross section that lies within 100 μm of the surface of the steel sheet. However, in a case where oxide-based inclusions having a particle diameter of 5 μm or greater are distributed non-uniformly in the sheet thickness direction, the evaluations are to be made at a depth where a maximum number of such oxide-based inclusions are present. Furthermore, the measurement is conducted by using an optical microscope, and the evaluation area is 100 mm$^2$ or greater.

The oxide-based inclusions having a particle diameter of 5 μm or greater inevitably include alumina, which is a product of deoxidation. However, alumina alone has little influence on delayed fracture resistance. On the other hand, if the alumina content of the oxide-based inclusions is less than 50 mass %, the oxides have a reduced melting point, and thus, during rolling, the oxide-based inclusions are elongated and are, therefore, likely to act as initiation sites for cracks that may develop during bending. Accordingly, the alumina content of the oxide-based inclusions having a particle diameter of 5 μm or greater is specified to be greater than or equal to 50 mass %. When silica and calcia coexist with alumina, the oxides have a reduced melting point, and thus, during rolling, the oxide-based inclusions are elongated and are, therefore, likely to act as initiation sites for cracks that may develop during bending; as a result, the delayed fracture resistance of the steel sheet is degraded. If the contents of silica and calcia in mass % are greater than 20 mass % and 40 mass %, respectively, bending workability is significantly degraded, and, therefore, the silica content is specified to be less than or equal to 20 mass %, and the calcia content is specified to be less than or equal to 40 mass %. Note that a more preferred composition for the inclusions, in terms of an average composition of the oxides present in steel in molten steel, has, in mass %, an alumina content of 60% or greater, a silica content of 10% or less, and a calcia content of 20% or less. In this instance, as described above, when, in terms of the number ratio, 80% or more of all of the oxide-based inclusions present in the steel sheet, that is, within 100 μm of the surface to be evaluated of the steel sheet in the sheet thickness direction, and having a particle diameter of 5 μm or greater have a composition that satisfies the composition range, good delayed fracture resistance can be achieved. Accordingly, the number ratio of the oxide-based inclusions having a composition that satisfies the above composition is specified to be greater than or equal to 80%. That is, the number ratio of the oxide-based inclusions having a composition in which the alumina content is 50 mass % or greater, the silica content is 20 mass % or less, and the calcia content is 40 mass % or less is specified to be greater than or equal to 80%. The number ratio is preferably greater than or equal to 88%, more preferably greater than or equal to 90%, and most preferably 100%, so as to further improve delayed fracture resistance. The adjustment of the composition of the oxides is accomplished by adjusting a composition of the slag in the converter process or the secondary refining process. Furthermore, the average composition of the oxides present in steel can be quantitatively determined by cutting a sample from a slab and using an extraction residue analysis method (see, for example, Kurayasu et al., Tetsu-to-Hagané, vol. 82 (1996), p. 1017). Note that in accordance with aspects of the present invention, the particle diameter of oxide-based inclusions is an equivalent circular diameter.

Now, reasons for the limitations on the microstructure will be described. Note that as a method for measuring a volume fraction, the method described in EXAMPLES is employed. As described in EXAMPLES, the volume fraction is represented by the corresponding area fraction, except for the retained austenite.

Volume Fraction of Martensite: 30 to 95%

When the volume fraction of martensite is greater than or equal to 30%, a strength of 980 MPa or greater, in terms of tensile strength, can be consistently ensured. The volume fraction of martensite is preferably greater than or equal to 55% and more preferably greater than or equal to 60%. The volume fraction of martensite is specified to be less than or equal to 95% so as to ensure elongation, which is an index of press formability. The volume fraction of martensite is preferably less than or equal to 90% and more preferably less than or equal to 85%. Note that in accordance with aspects of the present invention, the martensite includes tempered martensite.

Volume Fraction of Ferrite Phase: 5 to 70%

The ferrite phase, which is soft, contributes to improving the elongation of steel sheets. In accordance with aspects of the present invention, the volume fraction of the ferrite phase is greater than or equal to 5% so as to ensure elongation. The volume fraction of the ferrite phase is preferably greater than or equal to 10% and more preferably greater than or equal to 20%. On the other hand, if the ferrite phase is present in a volume fraction of greater than 70%, it may be difficult to ensure a tensile strength of 980 MPa in some cases, depending on the combination with the hardness of a low-temperature transformation phase. Accordingly, the ferrite phase is limited to less than or equal to 70% in volume fraction. The volume fraction of the ferrite phase is preferably less than or equal to 45% and more preferably less than or equal to 40%. Note that the ferrite phase includes bainitic ferrite.

Bainite: Less than 30% (and 0% or Greater)

Bainite is softer than martensite, and, therefore, degrades elongation as a result of a reduction in work hardenability. In addition, an austenite phase, which will be described below, may be formed as the bainite transformation proceeds, and, accordingly, it is preferable that bainite be absent. However, delayed fracture resistance, which is sought according to aspects of the present invention, is ensured as long as the amount of bainite is less than 30%. Accordingly, such an amount of bainite is permissible. Preferably, the amount of bainite is less than or equal to 3%.

Austenite Phase (Retained Austenite Phase): Less than 2.0% (and 0% or Greater)

It is preferable that the austenite phase be absent. However, less than 2.0% austenite phase is substantially harmless and, therefore, may be present. If the amount of the austenite phase is greater than or equal to 2.0%, the following instance may occur: since the austenite phase transforms into hard martensite during bending, in a case where the soft ferrite phase is present, bending crack initiation sites may be formed because of the large difference in hardness, and, consequently, delayed fracture resistance may be degraded. Accordingly, such an amount of austenite phase is not preferable.

One or more other phases, different from those described above, may be present to an extent that does not impair the effects according to aspects of the present invention. The other phases are permissible when the total volume fraction thereof is less than or equal to 4%. Examples of the other phases include pearlite.

Note that the high-strength steel sheet described above may include a galvanized layer. The galvanized layer is a hot-dip galvanized layer or an electrogalvanized layer, for example. The hot-dip galvanized layer may be a galvannealed layer, in which an alloy is formed.

The high-strength steel sheet according to aspects of the present invention, described above, has high strength because the chemical composition, the microstructure, and the state of the surface layer are adjusted as described above. Specifically, a tensile strength thereof, as measured by the method described in EXAMPLES, is greater than or equal to 980 MPa. Preferably, the tensile strength is greater than or equal to 1200 MPa. Note that while as high a tensile strength as possible is preferable, a tensile strength of less than or equal to 1600 MPa is preferable from the standpoint of ease of achieving a balance with other properties.

Furthermore, the high-strength steel sheet according to aspects of the present invention has excellent elongation because the chemical composition, the microstructure, and the state of the surface layer are adjusted as described above. Specifically, an elongation (El) thereof, as measured by the method described in EXAMPLES, is greater than or equal to 10%.

Furthermore, the high-strength steel sheet according to aspects of the present invention has excellent delayed fracture resistance. Specifically, since the chemical composition, the microstructure, and the state of the surface layer are adjusted as described above, excellent delayed fracture resistance is achieved.

A method for producing the high-strength steel sheet according to aspects of the present invention will now be described. According to aspects of the present invention, a method for producing the high-strength steel sheet includes a casting step, a hot rolling step, a cold rolling step, and an annealing step. The method may further include a galvanizing step, which is performed after the annealing step. Note that the temperatures associated with the heating or cooling of a slab (steel starting material), a steel sheet, and the like, which will be described below, are the surface temperatures of the slab (steel starting material), the steel sheet, and the like unless otherwise stated.

The casting step is a step in which continuous casting is performed after completion of refining, which is carried out in an RH vacuum degasser with a circulation time of 500 seconds or more. The conditions for the continuous casting include the following: the difference between a casting temperature and a solidification temperature is 10° C. or greater and 35° C. or less; a flow rate of molten steel at the solidification interface near the mold meniscus is 0.5 to 1.5 m/min; and the steel is passed through a bending section and a straightening section at a temperature of 550° C. or higher and 1050° C. or lower.

Circulation Time Associated with RH Vacuum Degasser: 500 Seconds or More

The circulation time for circulation in an RH vacuum degasser after the final addition of a metal or a ferroalloy for component adjustment is specified to be greater than or equal to 500 seconds. If a Ca-based complex oxide is present in the steel sheet, microcracks are formed during bending, that is, delayed fracture resistance is degraded, and, therefore, it is necessary to reduce such oxides. Accordingly, in the refining step, it is necessary to ensure that the circulation time for circulation in an RH vacuum degasser after the final addition of a metal or a ferroalloy for component adjustment is greater than or equal to 500 seconds. The circulation time is preferably greater than or equal to 650 seconds and more preferably greater than or equal to 800 seconds. The upper limit of the circulation time is not particularly limited, and, in terms of productivity, it is preferable that the circulation time be less than or equal to 3600 seconds.

Difference Between Casting Temperature and Solidification Temperature: 10° C. or Greater and 35° C. or Less Reducing the difference between the casting temperature and the solidification temperature promotes the formation of isometric crystals during solidification, which in turn reduces segregation of P, Mn, and the like. To produce this effect sufficiently, the difference between the casting temperature and the solidification temperature is specified to be less than or equal to 35° C. Preferably, the difference between the casting temperature and the solidification temperature is less than or equal to 30° C. On the other hand, if the difference between the casting temperature and the solidification temperature is less than 10° C., defects due to entrainment of powder, slag, or the like during casting may increase. Accordingly, the difference between the casting temperature and the solidification temperature is specified to be greater than or equal to 10° C. Preferably, the difference between the casting temperature and the solidification temperature is greater than or equal to 15° C. The casting temperature can be determined by actually measuring the temperature of the molten steel present in a tundish. The solidification temperature can be determined by actually measuring the chemical composition of the steel and using the following equation.

$$\text{Solidification temperature (° C.)}=1539-(70\times[\% C]+8\times[\% Si]+5\times[\% Mn]+30\times[\% P]+25\times[\% S]+5\times[\% Cu]+4\times[\% Ni]+1.5\times[\% Cr])$$

In the equation, "[% chemical symbol]" denotes a content (mass %) of the element in the steel.

Flow Rate of Molten Steel at Solidification Interface near Mold Meniscus: 0.5 to 1.5 m/min In continuous casting, which is performed after completion of refining, a flow rate of the molten steel at the solidification interface near the mold meniscus is to be less than or equal to 1.5 m/min. This causes non-metallic inclusions to float to the surface and, therefore, be removed. If the flow rate of the molten steel is greater than 1.5 m/min, an amount of the non-metallic inclusions remaining in the steel increases, which leads to an increase in microcracks; thus, delayed fracture resistance is degraded. Preferably, the flow rate of the molten steel is less than or equal to 1.2 m/min. On the other hand, if the flow rate of the molten steel is less than 0.5 m/min, the rate of solidification significantly decreases, which leads to increases in the degree of Mn segregation and the maximum P concentration; as a result, delayed fracture resistance is degraded. The flow rate of the molten steel is greater than or equal to 0.5 m/min and preferably greater than or equal to 0.8 m/min.

Bending Section and Straightening Section Passage Temperature: 550° C. or Higher and 1050° C. or Lower When a bending section and straightening section passage temperature is lower than or equal to 1050° C., segregation of P, Mn, and the like is reduced because bulging of a strand is inhibited; therefore, MnS particle groups having a longitudinal dimension of 150 μm or greater are reduced, and the maximum P concentration is reduced, in a region within 100 μm of the surface of the steel sheet in the sheet thickness direction. Hence, such a bending section and straightening section passage temperature is effective for improving delayed fracture resistance. If the passage temperature is higher than 1050° C., the effect is reduced. More preferably, the passage temperature is lower than or equal to 1000° C.

On the other hand, if the bending section and straightening section passage temperature is lower than 550° C., the strand becomes hard, which increases the deformation load of the bend straightening device, and, as a result, the life of the rolls of the straightening section is shortened, and, at the final stage of solidification, soft reduction, which is performed with a narrowed roll gap, does not function sufficiently, which results in deterioration of centerline segregation. Accordingly, the passage temperature is to be higher than or equal to 550° C.

The hot rolling step is a step in which the steel starting material obtained in the casting step is heated directly after the casting step or after cooling to a temperature of 1220° C. or higher and 1300° C. or lower and held for 80 minutes or more; and hot rolling is performed in a manner such that an amount of reduction for a first pass of rough rolling is 10% or greater, and an amount of reduction for a first pass of finish rolling is 20% or greater, and after completion of the hot rolling, coiling is performed.

Slab Heating Temperature: 1220° C. or Higher and 1300° C. or Lower, for 80 Minutes or More The steel starting material obtained in the casting is to be heated as necessary (when the temperature of the steel slab after casting is in a range of 1220° C. or higher and 1300° C. or lower, heating is not necessary), and the steel starting material is to be held in the range of the slab surface temperature of 1220° C. or higher and 1300° C. or lower for 80 minutes or more. This is one of the important requirements for reducing the number of MnS particle groups having a longitudinal dimension of 150 µm or greater. In addition, reductions in segregation of Mn and segregation of P are achieved. If the holding temperature is lower than 1220° C., MnS is not sufficiently dissolved during soaking, and, therefore, coarse MnS particles formed during the casting remain, without being sufficiently dissolved, and in the subsequent hot rolling and in cold rolling that follows, a large number of MnS particle groups elongated to have a longitudinal dimension of 150 µm or greater are formed; consequently, sufficient delayed fracture resistance is not achieved. Preferably, the slab heating temperature is higher than or equal to 1240° C. Increasing the heating temperature to an excessively high temperature is not preferable economically, and, therefore, the slab heating temperature is specified to be lower than or equal to 1300° C. If the holding time associated with the slab heating temperature range is less than 80 minutes, MnS is not sufficiently dissolved during soaking, and, therefore, coarse MnS particles formed during the casting remain, without being sufficiently dissolved, and in the subsequent hot rolling and in cold rolling that follows, a large number of MnS particle groups elongated to have a longitudinal dimension of 150 µm or greater are formed; consequently, sufficient delayed fracture resistance is not achieved. The holding time associated with the slab heating temperature range is greater than or equal to 80 minutes and more preferably greater than or equal to 90 minutes. The upper limit of the holding time is not particularly limited and is preferably less than or equal to 120 minutes. This is because a holding time of greater than 120 minutes can be a factor that impairs productivity.

Amount of Reduction for First Pass of Rough Rolling: 10% or Greater

When an amount of reduction for the first pass of rough rolling is greater than or equal to 10%, segregation of Mn and segregation of P can be reduced, and as a result, delayed fracture resistance is improved. Preferably, the amount of reduction is greater than or equal to 12%. If the amount of reduction is less than 10%, a segregation reducing effect is diminished, and, consequently, sufficient delayed fracture resistance is not achieved. Note that an excessive amount of reduction in the first pass may impair the shape of the steel sheet, and, therefore, the amount of reduction is preferably less than or equal to 18%.

Amount of Reduction for First Pass of Finish Rolling: 20% or Greater

When an amount of reduction for the first pass of finish rolling is greater than or equal to 20%, segregation of Mn and segregation of P can be reduced, and as a result, delayed fracture resistance is improved. Preferably, the amount of reduction is greater than or equal to 24%. If the amount of reduction is less than 20%, a segregation reducing effect is diminished, and, consequently, sufficient delayed fracture resistance is not achieved. Note that from the standpoint of sheet threading performance for the hot rolling, it is preferable that the amount of reduction be less than or equal to 35%.

Hot Finish Rolling Temperature: $Ar_3$ Transformation Temperature or Higher (Preferred Condition)

If the hot finish rolling temperature is lower than an $Ar_3$ transformation temperature, the microstructure resulting from the hot finish rolling is a band-shaped microstructure with elongated grains, and even after cold rolling and annealing, the band-shaped microstructure with elongated grains remains; as a result, sufficient elongation may not be achieved. Accordingly, it is preferable that the hot finish rolling temperature be higher than or equal to the $Ar_3$ transformation temperature. No preferred upper limit is specified for the finish rolling temperature. However, if the finish rolling temperature is higher than 1000° C., the microstructure resulting from the hot finish rolling is coarse, and the microstructure remains coarse after cold rolling and annealing; as a result, elongation may be reduced. Furthermore, in this case, the hot-rolled sheet is retained at high temperatures for a long time after the hot finish rolling, which results in a large scale thickness and, therefore, an increased surface roughness after pickling; consequently, the bendability of the cold-rolled and annealed steel sheet is adversely affected. Note that the $Ar_3$ transformation temperature is defined by the following equation.

$$Ar_3 \text{transformation temperature (° C.)}=910-310\times[\% C]-80\times[\% Mn]-20\times[\% Cu]-15\times[\% Cr]-55\times[\% Ni]-80\times[\% Mo]+0.35\times(t-8)$$

In the equation, "[% chemical symbol]" denotes a content (mass %) of the element, and in the case of elements that are not included, the content is 0. Furthermore, t denotes a thickness (mm) of the steel sheet.

Coiling Temperature: Lower than 600° C. (Preferred Condition)

It is preferable that a coiling temperature be lower than 600° C. If the coiling temperature is higher than or equal to 600° C., pearlite is formed along a Mn segregation zone in a cooling process after coiling, and, in a subsequent annealing process, a band-shaped microstructure having a significant Mn concentration may be formed in the pearlite region. From the standpoint of reducing segregation of Mn, it is preferable that the coiling temperature be lower than 600° C. so as to inhibit pearlite from being formed in the cooling process after coiling, thereby forming a microstructure including bainite and martensite as principal constituents. From the standpoint of further reducing pearlite that is formed in the cooling process, thereby reducing the degree of Mn segregation, it is more preferable that the coiling temperature be lower than or equal to 570° C. On the other hand, if the coiling temperature is lower than 400° C., shape defects may appear in the steel sheet, and/or the steel sheet may become excessively hard, which may cause breakage during cold rolling. Accordingly, the coiling temperature is preferably higher than or equal to 400° C. and more preferably higher than or equal to 420° C.

The cold rolling step is a step in which, after the hot-rolled steel sheet obtained in the hot rolling step is pickled, the hot-rolled steel sheet is subjected to cold rolling.

Cold Rolling Reduction Ratio: 40% or Greater (Preferred Condition)

If a cold rolling reduction ratio is less than 40%, a uniform strain is not introduced into the steel sheet, and, consequently, variations may occur in the progress of recrystallization in the steel sheet, which may result in a non-uniform microstructure in which coarse grains and fine grains exist. As a result, sufficient elongation may not be achieved. Accordingly, it is preferable that the cold rolling reduction ratio be greater than or equal to 40%. The upper limit is not particularly limited and is preferably less than or equal to 80%. This is because a rolling reduction ratio of greater than 80% can be a factor that impairs productivity. More preferably, the cold rolling reduction ratio is 45 to 70%.

The annealing step is a step in which the cold-rolled steel sheet obtained in the cold rolling step is annealed. Preferably, the annealing step is as follows. The cold-rolled steel sheet obtained in the cold rolling step is heated to a temperature range of 780 to 900° C. Thereafter, the steel sheet is soaked in the temperature range for 20 seconds or more. Then, primary cooling is performed to cool the steel sheet from the soaking temperature to a rapid cooling start temperature of 580° C. or higher at an average primary cooling rate of 1 to 100° C./s. Thereafter, secondary cooling is performed to cool the steel sheet from the rapid cooling start temperature to 300° C. or lower at an average secondary cooling rate of 80° C./sec or greater and less than 2000° C./sec, the average secondary cooling rate being an average cooling rate for a range from the rapid cooling start temperature to 300° C. Then, the steel sheet is held under the conditions including a retention time for a temperature range of 450 to 130° C. of 10 to 1000 seconds. Then, tertiary cooling is performed to cool the steel sheet over a temperature range of 130 to 50° C. at an average tertiary cooling rate of 5° C./sec or greater.

Annealing Temperature (Soaking Temperature): 780 to 900° C.

If the annealing temperature is lower than 780° C., a ferrite fraction increases during heating/annealing, and, therefore, the ferrite phase that is finally obtained after annealing may constitute an excessively large volume fraction; as a result, a desired martensite fraction may not be achieved, and, consequently, it may be difficult to ensure a tensile strength of 980 MPa or greater. On the other hand, in a case where the annealing temperature is higher than 900° C., if the steel sheet is heated to an austenite single phase temperature range, an austenite grain diameter may be excessively coarsened, and, therefore, the amount of the ferrite phase that is formed in a subsequent cooling process may decrease, and as a result, elongation may be reduced. Accordingly, it is preferable that the annealing temperature be 780 to 900° C. More preferably, the annealing temperature is 790 to 860° C.

Soaking Time: 20 Seconds or More

If the soaking time is less than 20 seconds, a sufficient amount of austenite is not formed, and, consequently, sufficient strength may not be achieved. The soaking time is greater than or equal to 20 seconds and preferably greater than or equal to 30 seconds. Note that the upper limit of the soaking time is not particularly limited, and it is preferable that the soaking time be less than or equal to 1200 seconds so as not to impair productivity. Note that to ensure the retention time, the cooling may not be started immediately after the heating, that is, the steel sheet may be held for a certain period of time.

Average Primary Cooling Rate: 1 to 100° C./Sec

The average primary cooling rate is an average cooling rate for cooling from the soaking temperature to the rapid cooling start temperature of 580° C. or higher. After the soaking, the average cooling rate for cooling from the soaking temperature to the rapid cooling start temperature is controlled to be 1 to 100° C./sec. As a result, the ferrite fraction is adjusted, which ensures a desired elongation. If the average primary cooling rate is greater than 100° C./sec, a desired ferrite fraction is not ensured, and as a result, elongation may be degraded. From the standpoint of productivity, it is preferable that the average primary cooling rate be greater than or equal to 1° C./sec. Note that it is necessary to cool the steel sheet at least to the rapid cooling start temperature, and, therefore, it is preferable that the cooling stop temperature be 580° C. or higher. Preferably, the cooling stop temperature is lower than or equal to 780° C.

Average Secondary Cooling Rate: 80° C./Sec or Greater and Less than 2000° C./Sec The average secondary cooling rate is an average cooling rate for cooling from the rapid cooling start temperature, at which the cooling rate is 80° C./sec or greater, to 300° C. After the primary cooling, the average cooling rate for cooling from the rapid cooling start temperature to 300° C. is controlled to be 80° C./sec or greater and less than 2000° C./sec. This is to inhibit an excessive formation of bainite and inhibit excessive tempering of martensite. As a result, a specific strength is ensured, and excellent delayed fracture resistance is ensured. From the standpoint of productivity, it is preferable that the secondary cooling rate be less than 2000° C./sec. It is preferable that the average secondary cooling rate be greater than or equal to 80° C./sec so as to inhibit an excessive formation of bainite and inhibit excessive tempering of martensite. Note that to inhibit an excessive formation of bainite and inhibit excessive tempering of martensite, it is preferable that the steel sheet be cooled to at least 300° C. Accordingly, it is preferable that the cooling stop temperature be lower than or equal to 300° C. The lower limit of the cooling stop temperature is not particularly limited. Typically, the cooling stop temperature is not lower than 0° C.

Retention (Holding) Time for Temperature of 450 to 130° C.: 10 to 1000 Seconds

After the secondary cooling, reheating is performed as necessary, and the steel sheet is held at a temperature of 450 to 130° C. for 10 to 1000 seconds. Note that it is preferable that the heating be performed rapidly at 1 to 50° C./s so as to inhibit segregation of P at the interfaces of the inclusions to retain excellent delayed fracture resistance. The holding at a temperature of 450 to 130° C. causes the martensite obtained in the primary cooling to undergo a tempering process. As a result, delayed fracture resistance is improved. If the holding temperature is lower than 130° C., the effect may not be sufficiently produced. On the other hand, if the holding temperature is higher than 450° C., it may become difficult to achieve a tensile strength of 980 MPa or greater, and, in addition, coarsening of precipitates such as iron-based carbides may degrade delayed fracture resistance. The holding temperature is preferably 150 to 320° C. and more preferably 180 to 300° C.

Furthermore, if the holding time associated with the holding temperature range is less than 10 seconds, a martensite tempering effect such as that described above may not be sufficiently produced. On the other hand, if the holding time is greater than 1000 seconds, a significant decrease in strength occurs, and as a result, a tensile strength of 980 MPa or greater may not be achieved. Accordingly, the holding time is preferably 10 to 1000 seconds and more preferably 200 to 800 seconds.

Average Tertiary Cooling Rate: 5° C./Sec or Greater

If the average cooling rate for the tertiary cooling, which is performed to cool the steel sheet over a temperature range of 130 to 50° C. after the holding (retention), is less than 5° C./sec, tempering progresses excessively, and productivity decreases. Accordingly, it is preferable that the average cooling rate (average tertiary cooling rate) for the temperature range be greater than or equal to 5° C./sec. On the other hand, the upper limit of the average tertiary cooling rate is, in terms of ensuring strength, not particularly limited. Since a cooling rate of greater than 2000° C./sec is difficult to realize, it is preferable that the upper limit be less than or equal to 2000° C./sec.

The cooling stop temperature for the tertiary cooling is not particularly limited.

Note that it is preferable that skin pass rolling be additionally performed after the tertiary cooling. It is preferable that the skin pass rolling be performed in a range of elongation rate of 0.1 to 0.7% so as to eliminate yield elongation.

The galvanizing step is a step in which galvanizing is performed on the steel sheet resulting from the annealing step. The galvanizing step is performed in a case where a galvanized layer is to be formed on a surface of the steel sheet.

Examples of galvanizing include electrogalvanizing and hot-dip galvanizing. Furthermore, an alloying process may be performed after hot-dip galvanizing.

Furthermore, whether or not the high-strength steel sheet has a galvanized layer, a solid lubricant or the like may be applied thereto as necessary.

EXAMPLES

Steel ingots were produced by using steels having respective chemical compositions as shown in Table 1; the conditions for melting and casting are as shown in Table 2. Hot rolling was performed on the obtained steel ingots under the conditions shown in Table 2. Thus, hot-rolled steel sheets having a sheet thickness of 2.8 mm were obtained. Note that the coiling temperature for the hot rolling was 550° C. Next, cold rolling was performed at a cold rolling reduction ratio of 50% to give a sheet thickness of 1.4 mm. Then, a process that used the annealing conditions shown in Table 2 was performed. After annealing, skin pass rolling was performed at an elongation rate of 0.2%. Note that each of the casting temperatures associated with Table 2 was determined by actually measuring the temperature of the molten steel present in a tundish. Furthermore, each of the solidification temperatures was determined by actually measuring the chemical composition of the steel and using the following equation.

Solidification temperature (° C.)=1539−(70×[% C]+8×[% Si]+5×[% Mn]+30×[% P]+25×[% S]+5×[% Cu]+4×[% Ni]+1.5×[% Cr])

In the equation, "[% chemical symbol]" denotes a content (mass %) of the element in the steel.

Note that the symbol "-" in Table 1 indicates that the optional element is not included (0 mass %) or present as an impurity, in an amount less than the lower limit.

TABLE 1

| | Mass % | | | | | | | | | | | | |
|---|---|---|---|---|---|---|---|---|---|---|---|---|---|
| Steel No. | C | Si | Mn | P | S | Sol. Al | N | O | Ca | Ti | Nb | V | Zr |
| 1 | 0.15 | 1.4 | 2.0 | 0.007 | 0.0009 | 0.037 | 0.0035 | 0.0011 | 0 | — | — | — | — |
| 2 | 0.16 | 0.8 | 2.1 | 0.005 | 0.0010 | 0.022 | 0.0024 | 0.0016 | 0.0002 | 0.015 | 0.022 | — | — |
| 3 | 0.20 | 1.2 | 1.5 | 0.003 | 0.0003 | 0.031 | 0.0034 | 0.0006 | 0.0002 | 0.012 | 0.004 | 0.010 | — |
| 4 | 0.16 | 1.0 | 2.1 | 0.007 | 0.0004 | 0.038 | 0.0028 | 0.0007 | 0.0005 | 0.010 | 0.030 | 0.050 | 0.005 |
| 5 | 0.14 | 1.8 | 2.1 | 0.010 | 0.0010 | 0.036 | 0.0030 | 0.0014 | 0 | — | — | — | — |
| 6 | 0.14 | 0.9 | 2.1 | 0.012 | 0.0010 | 0.022 | 0.0031 | 0.0007 | 0.0004 | — | 0.030 | — | — |
| 7 | 0.15 | 0.6 | 1.6 | 0.008 | 0.0012 | 0.028 | 0.0036 | 0.0011 | 0 | 0.030 | — | — | — |
| 8 | 0.13 | 0.2 | 2.1 | 0.008 | 0.0005 | 0.028 | 0.0026 | 0.0018 | 0 | — | — | — | — |
| 9 | 0.12 | 0.9 | 2.8 | 0.005 | 0.0008 | 0.029 | 0.0026 | 0.0012 | 0.0008 | — | — | — | — |
| 10 | 0.14 | 1.0 | 2.1 | 0.022 | 0.0011 | 0.024 | 0.0038 | 0.0007 | 0.0004 | — | — | — | — |
| 11 | 0.14 | 0.9 | 2.1 | 0.012 | 0.0016 | 0.027 | 0.0025 | 0.0011 | 0.0005 | — | — | — | — |
| 12 | 0.13 | 1.4 | 2.1 | 0.021 | 0.0016 | 0.036 | 0.0031 | 0.0009 | 0.0004 | — | — | — | — |
| 13 | 0.13 | 1.5 | 1.8 | 0.005 | 0.0014 | 0.065 | 0.0022 | 0.0008 | 0 | 0.005 | — | 0.002 | — |
| 14 | 0.33 | 0.04 | 2.1 | 0.006 | 0.0012 | 0.032 | 0.0030 | 0.0013 | 0.0002 | — | — | 0.011 | — |
| 15 | 0.18 | 0.9 | 1.8 | 0.008 | 0.0010 | 0.812 | 0.0041 | 0.0012 | 0.0003 | 0.010 | — | — | — |
| 16 | 0.22 | 1.2 | 2 | 0.009 | 0.0009 | 0.014 | 0.0034 | 0.0014 | 0.0002 | — | — | — | — |

| Steel No. | Cr | Mo | B | Cu | Ni | Sn | Sb | REM, Mg | Notes |
|---|---|---|---|---|---|---|---|---|---|
| 1 | — | — | — | — | — | — | — | — | Within invention range |
| 2 | — | — | 0.0011 | — | — | — | — | — | Within invention range |
| 3 | 0.20 | — | 0.0018 | — | — | — | — | — | Within invention range |
| 4 | 0.05 | 0.05 | 0.0009 | 0.05 | — | — | 0.005 | — | Within invention range |
| 5 | — | — | — | 0.15 | 0.10 | — | — | — | Within invention range |
| 6 | — | — | 0.0007 | — | — | 0.002 | — | REM: 0.001 | Within invention range |
| 7 | 0.04 | 0.02 | 0.0011 | 0.05 | — | — | 0.010 | — | Within invention range |
| 8 | — | — | 0.0002 | — | — | — | — | — | Within invention range |
| 9 | — | — | — | — | — | — | — | — | Outside invention range |
| 10 | — | — | — | — | — | — | — | — | Outside invention range |
| 11 | — | — | — | — | — | — | — | — | Outside invention range |
| 12 | — | — | — | — | — | — | — | — | Outside invention range |

TABLE 1-continued

| | | | Mass % | | | | | | |
|---|---|---|---|---|---|---|---|---|---|
| 13 | 0.03 | 0.01 | 0.0005 | 0.01 | 0.01 | 0.001 | — | Mg: 0.0002 | Within invention range |
| 14 | — | — | — | 0.07 | — | — | — | — | Within invention range |
| 15 | — | — | — | 0.12 | — | — | — | — | Within invention range |
| 16 | — | — | 0.0012 | — | — | — | — | — | Within invention range |

TABLE 2

| | | Steelmaking conditions | | | | Hot rolling conditions | | | | Annealing conditions | | |
|---|---|---|---|---|---|---|---|---|---|---|---|---|
| Steel sheet No. | Steel No. | Circulation time (s) | *1 (° C.) | Flow rate of molten steel (m/min) | *2 (° C.) | Heating temperature (° C.) | Heating time (min) | *3 (%) | *4 (%) | Soaking temperature (° C.) | Soaking time (s) | *5 (° C./s) |
| A | 1 | 600 | 32 | 1.0 | 800 | 1280 | 120 | 15 | 25 | 840 | 180 | 7 |
| B | 1 | 900 | 19 | 0.7 | 800 | 1230 | 90 | 15 | 25 | 830 | 180 | 7 |
| C | 1 | 900 | 31 | 1.0 | 750 | 1220 | 100 | 15 | 25 | 830 | 180 | 7 |
| D | 1 | 900 | 18 | 1.0 | 750 | 1270 | 90 | 15 | 25 | 830 | 180 | 7 |
| E | 1 | 900 | 25 | 1.0 | 750 | 1270 | 90 | 12 | 21 | 830 | 180 | 7 |
| F | 1 | 200 | 9 | 1.0 | 950 | 1250 | 90 | 15 | 25 | 830 | 180 | 7 |
| G | 1 | 900 | 38 | 0.3 | 950 | 1250 | 90 | 15 | 25 | 830 | 180 | 7 |
| H | 1 | 900 | 17 | 1.0 | 780 | 1150 | 90 | 15 | 25 | 830 | 180 | 7 |
| I | 1 | 900 | 36 | 1.0 | 780 | 1250 | 20 | 15 | 25 | 830 | 180 | 7 |
| J | 1 | 900 | 16 | 1.0 | 780 | 1230 | 90 | 7 | 8 | 830 | 180 | 7 |
| K | 2 | 900 | 32 | 1.0 | 1000 | 1270 | 90 | 15 | 25 | 810 | 180 | 15 |
| L | 3 | 900 | 14 | 1.0 | 1000 | 1270 | 90 | 15 | 25 | 860 | 240 | 7 |
| M | 4 | 900 | 17 | 1.0 | 900 | 1270 | 90 | 15 | 25 | 820 | 180 | 15 |
| N | 5 | 900 | 19 | 1.0 | 900 | 1270 | 90 | 15 | 25 | 790 | 120 | 8 |
| O | 6 | 900 | 22 | 1.0 | 850 | 1270 | 90 | 15 | 25 | 810 | 120 | 9 |
| P | 7 | 900 | 15 | 1.0 | 600 | 1270 | 90 | 15 | 25 | 800 | 120 | 9 |
| Q | 8 | 900 | 24 | 1.0 | 600 | 1270 | 90 | 15 | 25 | 780 | 120 | 9 |
| R | 9 | 900 | 18 | 1.0 | 750 | 1270 | 90 | 15 | 25 | 790 | 120 | 7 |
| S | 10 | 900 | 28 | 1.0 | 750 | 1270 | 90 | 15 | 25 | 810 | 120 | 9 |
| T | 11 | 900 | 25 | 1.0 | 750 | 1270 | 90 | 15 | 25 | 800 | 120 | 9 |
| U | 12 | 250 | 21 | 1.0 | 800 | 1150 | 90 | 14 | 24 | 830 | 120 | 10 |
| V | 13 | 1200 | 18 | 1.0 | 850 | 1230 | 80 | 20 | 25 | 830 | 180 | 12 |
| W | 13 | 1200 | 28 | 1.0 | 900 | 1220 | 120 | 20 | 25 | 830 | 180 | 6 |
| X | 13 | 900 | 24 | 1.0 | 500 | 1280 | 40 | 15 | 25 | 830 | 180 | 12 |
| Y | 13 | 900 | 11 | 1.0 | 1100 | 1280 | 40 | 15 | 25 | 830 | 180 | 6 |
| Z | 14 | 700 | 33 | 1.2 | 600 | 1250 | 85 | 15 | 25 | 830 | 240 | 7 |
| AA | 15 | 700 | 13 | 1.2 | 700 | 1230 | 90 | 15 | 25 | 830 | 240 | 7 |
| AB | 16 | 700 | 25 | 1.2 | 750 | 1280 | 90 | 15 | 25 | 830 | 240 | 7 |

| | Annealing conditions | | | | | | |
|---|---|---|---|---|---|---|---|
| Steel sheet No. | Rapid cooling start temperature (° C.) | *6 (° C./s) | Secondary cooling stop temperature (° C.) | Heating rate (° C.) | After-cooling holding temperature (° C.) | After-cooling retention time (s) | *7 (° C./s) | Notes |
| A | 715 | 1500 | 25 | 20 | 190 | 600 | 1000 | Invention example |
| B | 710 | 1500 | 25 | 20 | 190 | 600 | 1000 | Invention example |
| C | 710 | 1500 | 25 | 20 | 150 | 600 | 1000 | Invention example |
| D | 715 | 1500 | 25 | 20 | 150 | 600 | 1000 | Invention example |
| E | 715 | 1500 | 25 | 20 | 130 | 600 | 1000 | Invention example |
| F | 715 | 1500 | 25 | 20 | 150 | 600 | 1000 | Comparative example |
| G | 715 | 1500 | 25 | 20 | 150 | 600 | 1000 | Comparative example |
| H | 715 | 1500 | 25 | 20 | 150 | 600 | 1000 | Comparative example |
| I | 715 | 1500 | 25 | 20 | 150 | 600 | 1000 | Comparative example |
| J | 715 | 1500 | 25 | 20 | 150 | 600 | 1000 | Comparative example |
| K | 730 | 800 | 15 | 5 | 180 | 240 | 15 | Invention example |
| L | 780 | 1200 | 35 | 5 | 180 | 300 | 15 | Invention example |
| M | 720 | 80 | 260 | 1 | 280 | 240 | 15 | Invention example |
| N | 720 | 1200 | 100 | 10 | 150 | 400 | 15 | Invention example |
| O | 680 | 1000 | 15 | 50 | 180 | 400 | 50 | Invention example |
| P | 720 | 1000 | 20 | 30 | 180 | 400 | 50 | Invention example |
| Q | 720 | 1000 | 20 | 20 | 150 | 600 | 500 | Invention example |
| R | 720 | 1000 | 20 | 20 | 150 | 600 | 500 | Comparative example |
| S | 720 | 1000 | 20 | 20 | 150 | 600 | 500 | Comparative example |
| T | 710 | 1000 | 20 | 20 | 150 | 600 | 500 | Comparative example |
| U | 710 | 1000 | 20 | 20 | 150 | 600 | 500 | Comparative example |
| V | 580 | 1500 | 25 | 5 | 300 | 500 | 20 | Invention example |
| W | 680 | 1200 | 15 | 20 | 440 | 200 | 30 | Invention example |
| X | 580 | 1500 | 25 | 20 | 150 | 600 | 1000 | Comparative example |
| Y | 680 | 1200 | 25 | 20 | 150 | 600 | 1000 | Comparative example |
| Z | 700 | 1800 | 30 | 20 | 200 | 700 | 1000 | Invention example |

TABLE 2-continued

| | | | | | | | | |
|---|---|---|---|---|---|---|---|---|
| AA | 700 | 1800 | 30 | 20 | 200 | 700 | 1000 | Invention example |
| AB | 700 | 1800 | 30 | 20 | 200 | 700 | 1000 | Invention example |

*1: Difference between casting temperature and solidification temperature,
*2: Bending section and straightening section passage temperature,
*3: Amount of reduction for first pass of rough rolling
*4: Amount of reduction for first pass of finish rolling,
*5: Average primary cooling rate,
*6: Average secondary cooling rate,
*7: Average tertiary cooling rate For the cold-rolled steel sheets obtained in the manner described above, investigations were conducted for the microstructure (fractions (volume fractions) of the constituents), the degree of Mn segregation, the maximum P concentration, MnS particle groups, and oxide-based inclusions, and in addition, tensile properties and delayed fracture resistance were evaluated, as described below.

Microstructure (Fractions of Constituents)

A plane at a sheet-thickness ¼ position, in a cross section in the sheet thickness direction and parallel to the rolling direction, was examined with a scanning electron microscope (SEM). Thus, an investigation was conducted. The examination was performed with 5 fields of view (N=5). By using cross-sectional microstructure photographs taken at a magnification of 2000 times, image analysis was performed to determine the area occupied by each of the phases present in square regions measuring 50 µm×50 µm, which were randomly selected. For each of the phases, the determined areas were averaged, and the average was designated as the volume fraction. The ferrite phase, the pearlite, the martensite, and the bainite were distinguished based on the microstructural morphologies, and their volume fractions were calculated. Note that as defined in accordance with aspects of the present invention, the martensite and the bainite both have a lath structure and have a morphology in which acicular iron-based carbides form in the grains. The martensite and the bainite can be distinguished based on the state of orientation of acicular carbides in the grains in the SEM microstructure. That is, acicular carbides in bainite are formed in a specific orientation relationship with the bainite matrix, and, therefore, the extension of the carbides is oriented in one direction. On the other hand, acicular carbides in martensite have more than one orientation relationship with the martensite matrix.

Furthermore, the amount of the retained austenite phase was determined by X-ray diffraction analysis with Mo—Kα radiation. Specifically, a specimen having a measurement surface was used; the measurement surface corresponded to a plane located at or near a sheet-thickness ¼ position of a sheet surface containing a plane parallel to the rolling direction of the steel sheet. From the peak intensities of the (211) plane and (220) plane of the austenite phase and the (200) plane and (220) plane of the ferrite phase, the volume fraction of the retained austenite phase was calculated, and thus the value of the volume fraction was determined.

Evaluations of Degree of Mn Segregation and Maximum P Concentration

A Mn concentration distribution and a P concentration distribution in a region within 100 µm of the surface in the sheet thickness direction were measured by using an EPMA (electron probe micro analyzer). Note that the measured values of a region within a depth of less than 10 µm of the outermost surface include measurement errors inherent in a measurement of a surface, and were, therefore, excluded from the measurements. In this instance, since the measurement results vary with the EPMA measurement conditions, the following fixed conditions were used: an acceleration voltage of 15 kV, a probe current of 2.5 µA, an irradiation time of 0.05 s/point, a probe diameter of 1 µm, and a measurement pitch of 1 µm, and in addition, a measurement area of 45000 µm² (90 µm (depth direction)×500 µm (rolling direction)) was specified. Accordingly, measurements were conducted. From the obtained data, a data average value was calculated for each of 3 µm×3 µm regions, and the value was designated as the measurement data of the region. In accordance with aspects of the present invention, each of the evaluation regions had a size of 3 µm×3 µm. Note that if inclusions, such as MnS particles, are present, an apparent maximum degree of Mn segregation increases, and, therefore, in cases where inclusions were encountered, the corresponding value was excluded for evaluations.

Evaluations of MnS Particle Groups Present in Steel Sheet

In a cross section in the sheet thickness direction and parallel to the rolling direction of the steel sheet, an area within a depth of 100 µm of the surface of the steel sheet in the sheet thickness direction was examined with an SEM. An SEM-EDX analysis was performed on all of the observed inclusions to identify MnS, and an investigation was conducted to find the number of MnS particle groups determined to have a longitudinal dimension of 150 µm or greater. The evaluation area was 3 mm² (100 µm (depth direction)×30000 µm (rolling direction)).

Evaluations of Oxide-Based Inclusions Present in Steel Sheet

Planes at depths of 50 µm and 100 µm in the sheet thickness direction with respect to the surface of the steel sheet, the planes being parallel to a sheet surface, were examined in an area of 10 mm×10 mm, and an investigation was conducted to find the number of inclusion particles having a particle diameter of 5 µm or greater (the results were the same (equal) for the 50-µm depth position and the 100 µm-depth position, and, therefore, the results of only one of these are shown in the table). Note that the plane parallel to the sheet surface is a cross section containing the rolling direction. Furthermore, in accordance with aspects of the present invention, the particle diameter of the oxide-based inclusions is an equivalent circular diameter. Furthermore, an SEM-EDX analysis was performed on all of the inclusion particles having a particle diameter of 5 µm or greater to quantitatively analyze their compositions. Accordingly, the number of inclusion particles having a composition in which the alumina content was 50 mass % or greater, the silica content was 20 mass % or less, and the calcia content was 40 mass % or less (the number of inclusion particles having the target composition) was determined. Furthermore, the ratio of the number of inclusion particles having the target composition to the number of all the inclusion particles having a particle diameter of 5 µm or greater, which was identified in the examination described above, was determined according to the equation below. Thus, a ratio of inclusion particles having the target composition was determined.

Ratio (%) of number of inclusion particles having target composition={(number of inclusion particles having target composition)/(number of all inclusion particles having particle diameter of 5 μm or greater)}×100

Here, regarding the analysis of oxide-based inclusions elongated to have an aspect ratio (the length in the rolling direction/the length in the sheet thickness direction) of 2 or greater, in cases where the length in the rolling direction was 10 μm or greater, the length in the rolling direction was divided into two or more sections (such that the resulting divided regions each have a length in the rolling direction of 5 to 10 μm), and then a longitudinal middle portion of the inclusions in each of the divided regions was analyzed, and the analysis values of the divided regions were averaged.

Tensile Properties

A JIS No. 5 specimen (JIS Z 2201) was cut from the surface of the steel sheet such that the longitudinal direction of the specimen was a direction perpendicular to the rolling direction, and a tensile test was conducted in accordance with JIS Z 2241. Thus, a yield strength (YS), a tensile strength (TS), and a butt elongation (EI) were determined.

Delayed Fracture Resistance

Nine U-bent bolt-tightened specimens, to which a stress of 2000 MPa had been applied by using the method described above, were prepared. The bending was performed in the following manner: for high-strength steel sheets having a tensile strength TS of 980 MPa or greater and less than 1320 MPa, R/t=3.0; for high-strength steel sheets having a tensile strength TS of 1320 MPa or greater and less than 1470 MPa, R/t=4.0; and for high-strength steel sheets having a tensile strength TS of 1470 MPa or greater, R/t=5.0, where R/t is the ratio between a bend radius R and a sheet thickness t. The prepared specimens were immersed in 5 wt % hydrochloric acid, of which the solution volume-to-specimen area ratio was 60 ml/cm$^2$, for up to 96 hours. If no cracks having a length of 1 mm or greater were formed in all of the nine specimens, a determination was made that the steel sheet had excellent delayed fracture resistance. In cases where one or more specimens experienced cracking, the minimum time that it took for cracking to occur was measured.

The results are shown in Table 3. The results demonstrate that the steel sheets of Invention Examples have a tensile strength TS of 980 MPa or greater and have excellent delayed fracture resistance. In contrast, the steel sheets of Comparative Examples have low delayed fracture resistance.

TABLE 3

| Steel sheet No. | Steel No. | Segregation Degree of Mn segregation | Segregation Maximum P concentration (mass %) | MnS particle groups (number/mm$^2$) | Number of oxide-based inclusions (number/mm$^2$) | Number of inclusions having target composition (number/mm$^2$) | Ratio of inclusions having target composition (%) | Microstructure *1 (%) | Microstructure *2 (%) |
|---|---|---|---|---|---|---|---|---|---|
| A | 1 | 1.2 | 0.04 | 0.7 | 5.0 | 4.0 | 80 | 38 | 62 |
| B | 1 | 1.4 | 0.06 | 1.3 | 3.5 | 3.0 | 86 | 38 | 62 |
| C | 1 | 1.3 | 0.06 | 1.3 | 5.0 | 4.5 | 90 | 36 | 64 |
| D | 1 | 1.3 | 0.06 | 1.3 | 4.0 | 4.0 | 100 | 36 | 64 |
| E | 1 | 1.3 | 0.05 | 1.0 | 5.0 | 4.5 | 90 | 39 | 61 |
| F | 1 | 1.2 | 0.06 | 1.3 | 21.0 | 13.0 | 62 | 38 | 62 |
| G | 1 | 1.8 | 0.11 | 2.3 | 2.0 | 2.0 | 100 | 39 | 61 |
| H | 1 | 1.6 | 0.10 | 2.7 | 5.5 | 4.5 | 82 | 38 | 62 |
| I | 1 | 1.7 | 0.09 | 2.7 | 6.0 | 5.0 | 83 | 37 | 63 |
| J | 1 | 1.6 | 0.09 | 2.3 | 4.5 | 4.0 | 89 | 39 | 61 |
| K | 2 | 1.3 | 0.06 | 1.3 | 5.5 | 4.5 | 82 | 13 | 87 |
| L | 3 | 1.2 | 0.06 | 0.0 | 6.0 | 5.0 | 83 | 5 | 95 |
| M | 4 | 1.2 | 0.06 | 0.3 | 8.0 | 7.0 | 88 | 31 | 38.5 |
| N | 5 | 1.3 | 0.06 | 2.0 | 6.5 | 6.0 | 92 | 35 | 65 |
| O | 6 | 1.2 | 0.07 | 2.0 | 8.0 | 7.0 | 88 | 32 | 68 |
| P | 7 | 1.3 | 0.06 | 2.0 | 3.5 | 3.5 | 100 | 34 | 66 |
| Q | 8 | 1.3 | 0.05 | 0.3 | 3.0 | 3.0 | 100 | 33 | 67 |
| R | 9 | 1.8 | 0.06 | 2.7 | 4.5 | 4.0 | 89 | 32 | 68 |
| S | 10 | 1.3 | 0.10 | 2.0 | 4.0 | 4.0 | 100 | 35 | 65 |
| T | 11 | 1.3 | 0.07 | 3.3 | 4.0 | 3.5 | 88 | 32 | 68 |
| U | 12 | 1.6 | 0.10 | 3.7 | 14.0 | 6.0 | 43 | 35 | 65 |
| V | 13 | 1.2 | 0.07 | 1.7 | 3.0 | 3.0 | 100 | 55 | 45 |
| W | 13 | 1.3 | 0.07 | 2.0 | 3.0 | 3.0 | 100 | 38 | 62 |
| X | 13 | 1.6 | 0.10 | 2.4 | 8.0 | 6.5 | 81 | 58 | 42 |
| Y | 13 | 1.7 | 0.11 | 2.7 | 7.0 | 6.0 | 86 | 42 | 58 |
| Z | 14 | 1.2 | 0.05 | 1.3 | 5.0 | 4.0 | 80 | 68 | 32 |
| AA | 15 | 1.3 | 0.04 | 1.3 | 4.0 | 3.5 | 88 | 40 | 60 |
| AB | 16 | 1.3 | 0.04 | 1.3 | 5.0 | 4.0 | 80 | 45 | 55 |

| Steel sheet No. | Microstructure *3 (%) | Microstructure *4 (%) | Yield strength (MPa) | Tensile strength (MPa) | Elongation (%) | Fracture time | Notes |
|---|---|---|---|---|---|---|---|
| A | 0 | 0 | 860 | 1209 | 14 | More than 96 hr | Invention example |
| B | 0 | 0 | 830 | 1202 | 14 | More than 96 hr | Invention example |

TABLE 3-continued

| | *1 | *2 | | | | | |
|---|---|---|---|---|---|---|---|
| C | 0 | 0 | 783 | 1211 | 12 | More than 96 hr | Invention example |
| D | 0 | 0 | 786 | 1222 | 12 | More than 96 hr | Invention example |
| E | 0 | 0 | 808 | 1220 | 12 | More than 96 hr | Invention example |
| F | 0 | 0 | 809 | 1223 | 13 | 72 hr | Comparative example |
| G | 0 | 0 | 798 | 1219 | 12 | 24 hr | Comparative example |
| H | 0 | 0 | 801 | 1220 | 12 | 6 hr | Comparative example |
| I | 0 | 0 | 805 | 1218 | 13 | 12 hr | Comparative example |
| J | 0 | 0 | 800 | 1224 | 14 | 48 hr | Comparative example |
| K | 0 | 0 | 1092 | 1343 | 10 | More than 96 hr | Invention example |
| L | 0 | 0 | 1219 | 1492 | 10 | More than 96 hr | Invention example |
| M | 29 | 1.5 | 787 | 1196 | 13 | More than 96 hr | Invention example |
| N | 0 | 0 | 798 | 1215 | 13 | More than 96 hr | Invention example |
| O | 0 | 0 | 807 | 1194 | 13 | More than 96 hr | Invention example |
| P | 0 | 0 | 799 | 1196 | 13 | More than 96 hr | Invention example |
| Q | 0 | 0 | 795 | 1182 | 12 | More than 96 hr | Invention example |
| R | 0 | 0 | 794 | 1196 | 13 | 24 hr | Comparative example |
| S | 0 | 0 | 786 | 1202 | 12 | 72 hr | Comparative example |
| T | 0 | 0 | 817 | 1220 | 11 | 12 hr | Comparative example |
| U | 0 | 0 | 800 | 1221 | 13 | 4 hr | Comparative example |
| V | 0 | 0 | 730 | 1020 | 16 | More than 96 hr | Invention example |
| W | 0 | 0 | 810 | 1000 | 14 | More than 96 hr | Invention example |
| X | 0 | 0 | 746 | 1240 | 13 | 12 hr | Comparative example |
| Y | 0 | 0 | 771 | 1276 | 12 | 10 hr | Comparative example |
| Z | 0 | 0 | 764 | 1219 | 15 | More than 96 hr | Invention example |
| AA | 0 | 0 | 899 | 1200 | 12 | More than 96 hr | Invention example |
| AB | 0 | 0 | 867 | 1254 | 12 | More than 96 hr | Invention example |

*1: Volume fraction of ferrite,
*2: Volume fraction of martensite,
*3: Volume fraction of bainite,
*4: Volume fraction of austenite

REFERENCE SIGNS LIST

1 Specimen
2 Perforation
3 Washer
4 Stainless steel bolt
10 Steel sheet
11 MnS particle
12 MnS particle
D1 Rolling direction
L1 Longitudinal dimension of MnS particle group

The invention claimed is:

1. A high-strength steel sheet, the high-strength steel sheet having a chemical composition containing, in mass %,
C: 0.10 to 0.35%,
Si: 0.01 to 2.0%,
Mn: 1.5 to less than 2.2%,
P: 0.015% or less (and greater than 0%),
S: 0.0015% or less (and greater than 0%),
Sol. Al: 0.01 to 1.0%,
N: 0.0055% or less (and greater than 0%),
O: 0.0025% or less (and greater than 0%), and
Ca: 0.0005% or less (and 0% or greater), with a balance of Fe and incidental impurities, wherein
in a region within 100 μm of a surface of the high-strength steel sheet in a sheet thickness direction, a degree of Mn segregation is 1.5 or less,
in a region within 100 μm of the surface in the sheet thickness direction, a maximum P concentration is 0.08 mass % or less,
in a region within 100 μm of the surface in the sheet thickness direction, at least one MnS particle group formed of one or more MnS particles having a major axis of 0.3 μm or greater is present, the one or more MnS particles being elongated and/or distributed in a form of a sequence of dots in a rolling direction of the steel sheet, a distance between adjacent MnS particles being 40 μm or less in a case where the at least one MnS particle group is formed of two or more MnS particles, and a number of MnS particle groups having a longitudinal dimension of 150 μm or greater is 2.0 or fewer per 1 $mm^2$, as viewed in a cross section in a sheet thickness direction and parallel to the rolling direction,
in a region within 100 μm of the surface in the sheet thickness direction, a number of oxide-based inclusions having a particle diameter of 5 μm or greater is 8 or fewer per 1 $mm^2$ as viewed in a plane parallel to a sheet surface,
of all the number of the oxide-based inclusions having a particle diameter of 5 μm or greater, oxide-based inclusions having a composition in which an alumina content is 50 mass % or greater, a silica content is 20 mass % or less, and a calcia content is 40 mass % or less are present in the number ratio of 80% or greater,
the high-strength steel sheet has a microstructure that includes, in terms of a volume fraction, 30 to 95% martensite, 5 to 70% ferrite phase, less than 30% (and 0% or greater) bainite, and less than 2.0% (and 0% or greater) austenite phase, and
the high-strength steel sheet has a tensile strength of 980 MPa or greater.

2. The high-strength steel sheet according to claim 1, wherein the chemical composition further contains, in mass %, one or two or more selected from the following groups A to E:
Group A:
one or two or more selected from:
Ti: 0.003 to 0.05%,
Nb: 0.003 to 0.05%,
V: 0.001 to 0.1%, and
Zr: 0.001 to 0.1%.
Group B:
one or two or more selected from:
Cr: 0.01 to 1.0%,
Mo: 0.01 to 0.20%, and
B: 0.0001 to 0.0030%.

Group C:
one or two or more selected from:
Cu: 0.01 to 0.5%,
Ni: 0.01 to 0.5%, and
Sn: 0.001 to 0.1%.
Group D:
Sb: 0.001 to 0.1%.
Group E:
REMs and Mg in a total amount of 0.0002% or greater and 0.01% or less.

3. The high-strength steel sheet according to claim 1, further comprising a galvanized layer on the surface.

4. The high-strength steel sheet according to claim 2, further comprising a galvanized layer on the surface.

5. A method for producing a high-strength steel sheet, the high-strength steel sheet being the high-strength steel sheet according to claim 1, the method comprising:
   a casting step in which, after completion of refining, which is carried out in an RH vacuum degasser with a circulation time of 500 seconds or more, continuous casting is performed in a manner such that a difference between a casting temperature and a solidification temperature is 10° C. or greater and 35° C. or less, a flow rate of molten steel at a solidification interface near a mold meniscus is 0.5 to 1.5 m/min, and the steel is passed through a bending section and a straightening section at a temperature of 550° C. or higher and 1050° C. or lower;
   a hot rolling step in which a steel starting material obtained in the casting step is heated directly after the casting step or after cooling to a temperature of 1220 to 1300° C. and held for 80 minutes or more; and hot rolling is performed in a manner such that an amount of reduction for a first pass of rough rolling is 10% or greater, and an amount of reduction for a first pass of finish rolling is 20% or greater;
   a cold rolling step in which, after a hot-rolled steel sheet obtained in the hot rolling step is pickled, the hot-rolled steel sheet is subjected to cold rolling; and
   an annealing step in which a cold-rolled steel sheet obtained in the cold rolling step is annealed.

6. A method for producing a high-strength steel sheet, the high-strength steel sheet being the high-strength steel sheet according to claim 2, the method comprising:
   a casting step in which, after completion of refining, which is carried out in an RH vacuum degasser with a circulation time of 500 seconds or more, continuous casting is performed in a manner such that a difference between a casting temperature and a solidification temperature is 10° C. or greater and 35° C. or less, a flow rate of molten steel at a solidification interface near a mold meniscus is 0.5 to 1.5 m/min, and the steel is passed through a bending section and a straightening section at a temperature of 550° C. or higher and 1050° C. or lower;
   a hot rolling step in which a steel starting material obtained in the casting step is heated directly after the casting step or after cooling to a temperature of 1220 to 1300° C. and held for 80 minutes or more; and hot rolling is performed in a manner such that an amount of reduction for a first pass of rough rolling is 10% or greater, and an amount of reduction for a first pass of finish rolling is 20% or greater;
   a cold rolling step in which, after a hot-rolled steel sheet obtained in the hot rolling step is pickled, the hot-rolled steel sheet is subjected to cold rolling; and
   an annealing step in which a cold-rolled steel sheet obtained in the cold rolling step is annealed.

7. The method for producing a high-strength steel sheet according to claim 5, wherein the annealing step is a step performed in a manner such that the cold-rolled steel sheet obtained in the cold rolling step is heated to a temperature range of 780 to 900° C.; thereafter, the steel sheet is soaked in the temperature range for 20 seconds or more; then, primary cooling is performed to cool the steel sheet from the soaking temperature to a rapid cooling start temperature of 580° C. or higher at an average primary cooling rate of 1 to 100° C./s; thereafter, secondary cooling is performed to cool the steel sheet from the rapid cooling start temperature to 300° C. or lower at an average secondary cooling rate of 80° C./sec or greater and less than 2000° C./sec, the average secondary cooling rate being an average cooling rate for a range from the rapid cooling start temperature to 300° C.; then, the steel sheet is held under conditions including a retention time for a temperature range of 450 to 130° C. of 10 to 1000 seconds; and then, tertiary cooling is performed to cool the steel sheet over a temperature range of 130 to 50° C. at an average tertiary cooling rate of 5° C./sec or greater.

8. The method for producing a high-strength steel sheet according to claim 6, wherein the annealing step is a step performed in a manner such that the cold-rolled steel sheet obtained in the cold rolling step is heated to a temperature range of 780 to 900° C.; thereafter, the steel sheet is soaked in the temperature range for 20 seconds or more; then, primary cooling is performed to cool the steel sheet from the soaking temperature to a rapid cooling start temperature of 580° C. or higher at an average primary cooling rate of 1 to 100° C./s; thereafter, secondary cooling is performed to cool the steel sheet from the rapid cooling start temperature to 300° C. or lower at an average secondary cooling rate of 80° C./sec or greater and less than 2000° C./sec, the average secondary cooling rate being an average cooling rate for a range from the rapid cooling start temperature to 300° C.; then, the steel sheet is held under conditions including a retention time for a temperature range of 450 to 130° C. of 10 to 1000 seconds; and then, tertiary cooling is performed to cool the steel sheet over a temperature range of 130 to 50° C. at an average tertiary cooling rate of 5° C./sec or greater.

9. The method for producing a high-strength steel sheet according to claim 5, further comprising a galvanizing step in which galvanizing is performed on the steel sheet resulting from the annealing step.

10. The method for producing a high-strength steel sheet according to claim 6, further comprising a galvanizing step in which galvanizing is performed on the steel sheet resulting from the annealing step.

11. The method for producing a high-strength steel sheet according to claim 7, further comprising a galvanizing step in which galvanizing is performed on the steel sheet resulting from the annealing step.

12. The method for producing a high-strength steel sheet according to claim 8, further comprising a galvanizing step in which galvanizing is performed on the steel sheet resulting from the annealing step.

\* \* \* \* \*